US011528850B2

(12) United States Patent
Tchira et al.

(10) Patent No.: US 11,528,850 B2
(45) Date of Patent: Dec. 20, 2022

(54) INSERTABLE PLANTER, SYSTEM, AND METHODS

(71) Applicant: Dotchi, LLC, Miami, FL (US)

(72) Inventors: Harry Tchira, Miami, FL (US); Lars Holme Larsen, Copenhagen (DK); Elin Stavenow, Copenhagen (DK)

(73) Assignee: DOTCHI, LLC, Miami, FL (US)

( * ) Notice: Subject to any disclaimer, the term of this patent is extended or adjusted under 35 U.S.C. 154(b) by 587 days.

(21) Appl. No.: 16/041,154

(22) Filed: Jul. 20, 2018

(65) Prior Publication Data

US 2020/0022315 A1    Jan. 23, 2020

(51) Int. Cl.
   *A01G 9/02* (2018.01)
   *A01G 27/02* (2006.01)
   *G06Q 90/00* (2006.01)

(52) U.S. Cl.
   CPC .............. *A01G 9/02* (2013.01); *A01G 27/02* (2013.01); *G06Q 90/00* (2013.01)

(58) Field of Classification Search
   CPC . A01G 9/02; A01G 27/02; A01G 9/04; A01G 9/042
   See application file for complete search history.

(56) References Cited

U.S. PATENT DOCUMENTS

| 608,590 A | * | 8/1898 | Freund | ..................... | A01G 9/02 47/75 |
|---|---|---|---|---|---|
| 3,552,058 A | | 1/1971 | Fici | | |
| 3,595,267 A | | 7/1971 | Anderson | | |
| 3,775,904 A | | 12/1973 | Peters | | |
| 3,871,131 A | | 3/1975 | Berglund | | |
| 3,995,397 A | | 12/1976 | Despard, III | | |
| 4,528,774 A | | 7/1985 | Skaife | | |

(Continued)

FOREIGN PATENT DOCUMENTS

| CN | 2031197 U | 1/1989 |
|---|---|---|
| CN | 203723145 | 7/2014 |

(Continued)

OTHER PUBLICATIONS

Playmobil USA Lechuza Classico Self-Watering Polypropylene Indoor/OutdoorPlanter, http://www.hayneedle.com/product/classicoindoorplanter.cfm. Retrieved from internet Feb. 16, 2015.

*Primary Examiner* — Magdalena Topolski
*Assistant Examiner* — Katelyn T Truong
(74) *Attorney, Agent, or Firm* — Pabst Patent Group LLP

(57) ABSTRACT

An insertable planter system may include a container and an insert. A container may include a rim, an outer wall comprising an inner surface, a bottom portion comprising a floor, wherein the inner surface and floor may define a liquid reservoir. The floor may further include a positioning structure. An insert may include a lip, a sidewall, and a bottom. The sidewall and bottom may define a plant chamber. The insert may further include a complementary supporting structure, such that the container receives the insert so that the insert can be rotated into a suitable orientation where the complementary supporting structure of the insert engages the positioning structure of the container. A plant delivery method or system including such inserts, and a computer readable medium containing instructions for same.

20 Claims, 11 Drawing Sheets

(56) References Cited

U.S. PATENT DOCUMENTS

| | | |
|---|---|---|
| 4,916,858 A | 4/1990 | Hobson |
| 5,481,826 A | 1/1996 | Dickinson et al. |
| 5,564,226 A | 10/1996 | Paramest |
| 6,145,250 A * | 11/2000 | Mai ................. A01G 27/005 47/79 |
| 6,345,470 B1 | 2/2002 | Slaght et al. |
| 6,584,730 B1 * | 7/2003 | Mai ................. A01G 27/02 47/48.5 |
| 6,672,007 B1 * | 1/2004 | Lai ................. A01G 27/02 47/79 |
| 6,862,844 B1 | 3/2005 | Rubicz |
| 6,976,334 B1 | 12/2005 | Bowditch |
| 7,171,783 B1 | 2/2007 | Fidotti |
| 7,676,988 B2 | 3/2010 | Bradley |
| 7,690,150 B2 * | 4/2010 | Orschulik ......... A01G 9/021 47/66.1 |
| 7,703,240 B2 | 4/2010 | Watson et al. |
| 8,146,292 B2 | 4/2012 | Brandstatter |
| 8,191,310 B2 | 6/2012 | Keats |
| 8,689,485 B2 | 4/2014 | Friedman |
| 9,439,370 B2 * | 9/2016 | Donnelly ......... A01G 27/06 |
| 9,681,613 B2 | 6/2017 | Stanford |
| 2003/0106262 A1 * | 6/2003 | Lai ................. A01G 27/02 47/65.6 |
| 2004/0144027 A1 | 7/2004 | Dines |
| 2005/0005518 A1 | 1/2005 | Iseki et al. |
| 2005/0086861 A1 | 4/2005 | Atchley |
| 2006/0207175 A1 * | 9/2006 | Wu ................. A01G 27/02 47/79 |
| 2009/0205251 A1 * | 8/2009 | Irmler ............. A01G 9/02 47/79 |
| 2010/0147844 A1 | 6/2010 | Connell et al. |
| 2010/0218422 A1 * | 9/2010 | Eckert ............. A01G 27/02 47/65.6 |
| 2012/0000127 A1 | 1/2012 | Liu |
| 2012/0066971 A1 * | 3/2012 | Lin ................. A01G 27/02 47/80 |
| 2013/0067812 A1 * | 3/2013 | Masters ........... A01G 27/02 47/81 |
| 2013/0133255 A1 * | 5/2013 | Wu ................. A01G 27/02 47/66.1 |
| 2013/0291435 A1 * | 11/2013 | Gettig ............. A01G 27/008 47/79 |
| 2014/0053461 A1 * | 2/2014 | Blaha ............. A01G 13/00 47/20.1 |
| 2015/0033625 A1 * | 2/2015 | Jawarski ......... A01G 27/02 47/79 |
| 2015/0250107 A1 | 9/2015 | Joseph et al. |
| 2015/0342129 A1 * | 12/2015 | Boylan ........... A01G 9/02 47/66.7 |
| 2016/0212944 A1 | 7/2016 | Holby |
| 2017/0055459 A1 * | 3/2017 | Takaoka .......... A01G 9/042 |
| 2017/0079217 A1 | 3/2017 | Zappia et al. |
| 2017/0079218 A1 * | 3/2017 | Novoselac ....... A01G 9/02 |
| 2017/0127621 A1 | 5/2017 | Harger et al. |
| 2018/0007848 A1 * | 1/2018 | Hohmann ......... A01G 27/02 |
| 2019/0289802 A1 * | 9/2019 | Herbert, Jr. ...... A01G 29/00 |
| 2020/0077606 A1 * | 3/2020 | Hung .............. A01G 9/02 |
| 2020/0146232 A1 | 5/2020 | Hemerka ......... A01G 27/006 |
| 2021/0127606 A1 * | 5/2021 | Graffius ......... A01G 27/008 |

FOREIGN PATENT DOCUMENTS

| | | |
|---|---|---|
| DE | 19955488 A1 | 6/2001 |
| DE | 202006000586 U1 | 5/2006 |
| DE | 102005058436 A1 | 6/2007 |
| EP | 0171889 A1 | 2/1986 |
| EP | 1541011 A1 | 6/2005 |
| EP | 2644024 A1 | 10/2013 |
| GB | 2277859 A | 11/1994 |
| GB | 2315004 A | 1/1998 |
| GB | 2320882 A | 7/1998 |
| GB | 2413048 A | 10/2005 |
| WO | 2009125023 A1 | 10/2009 |

* cited by examiner

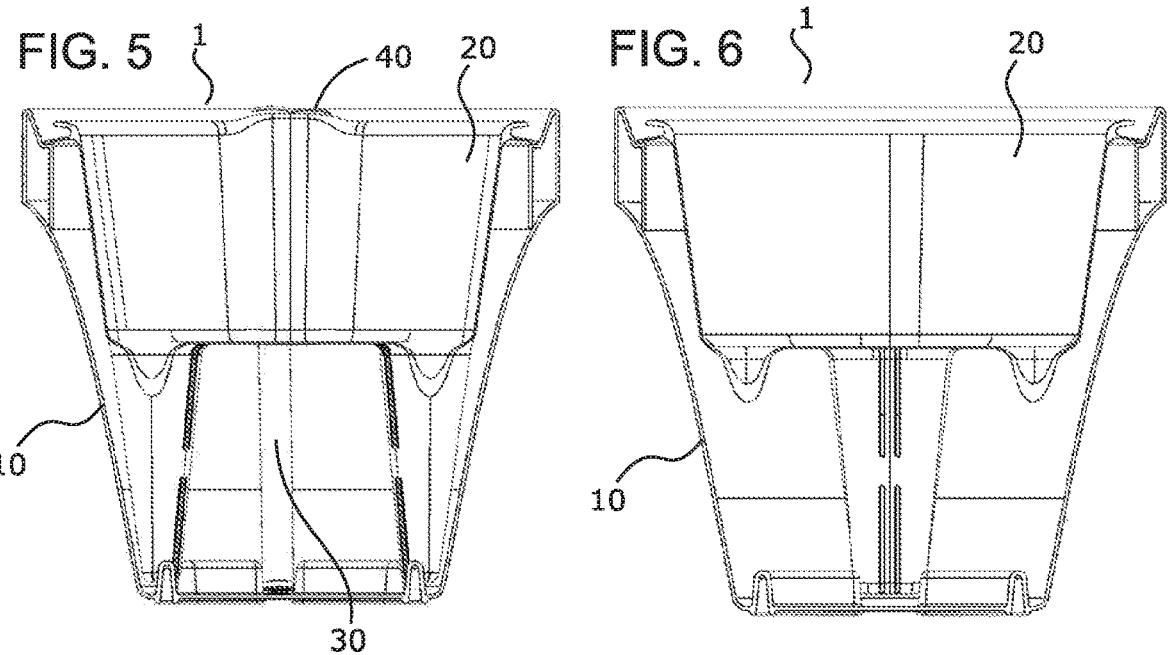
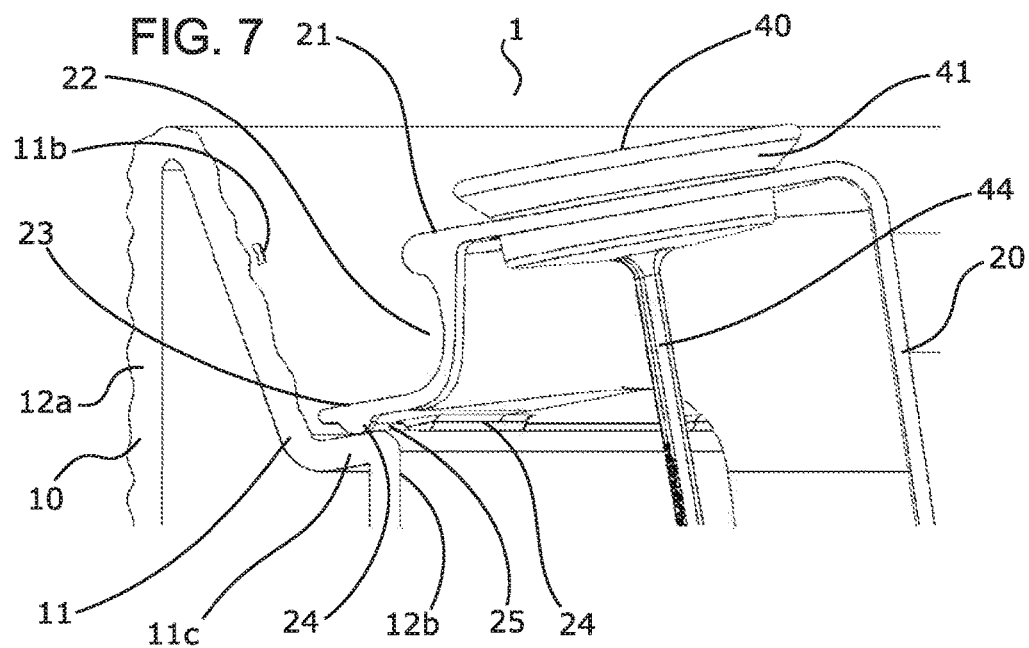

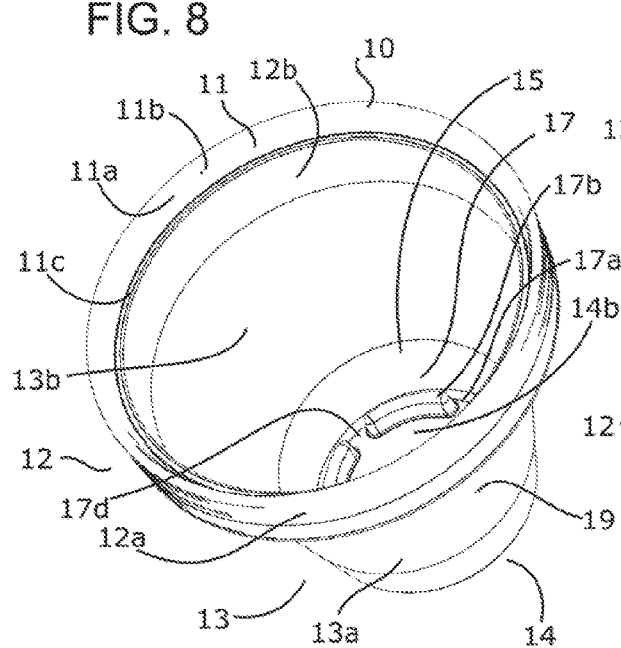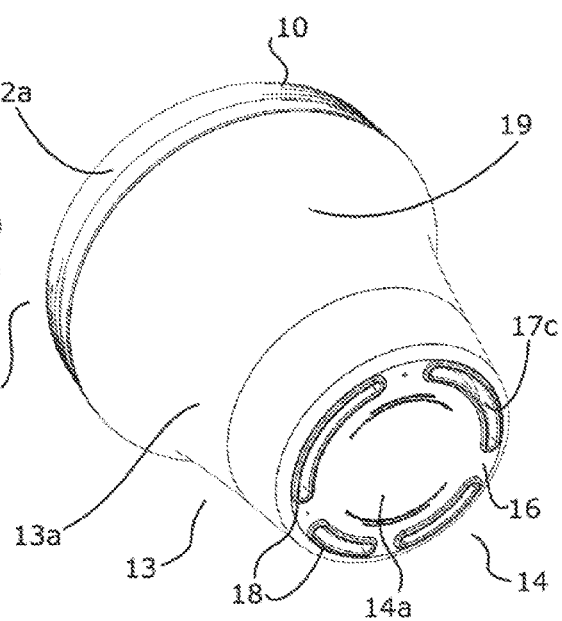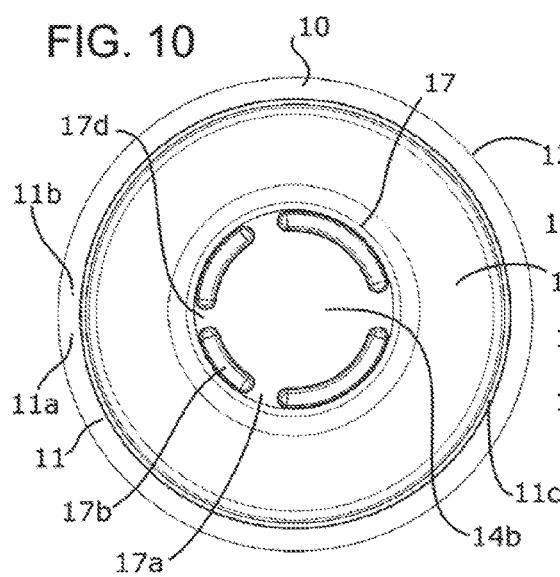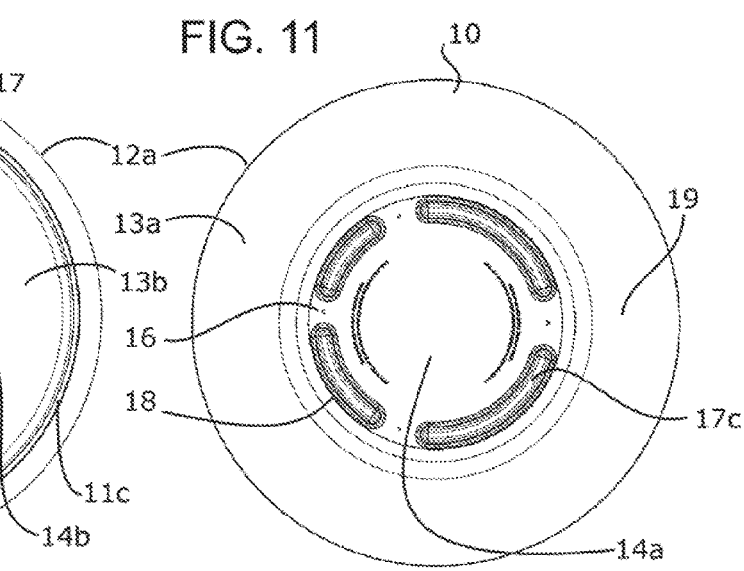

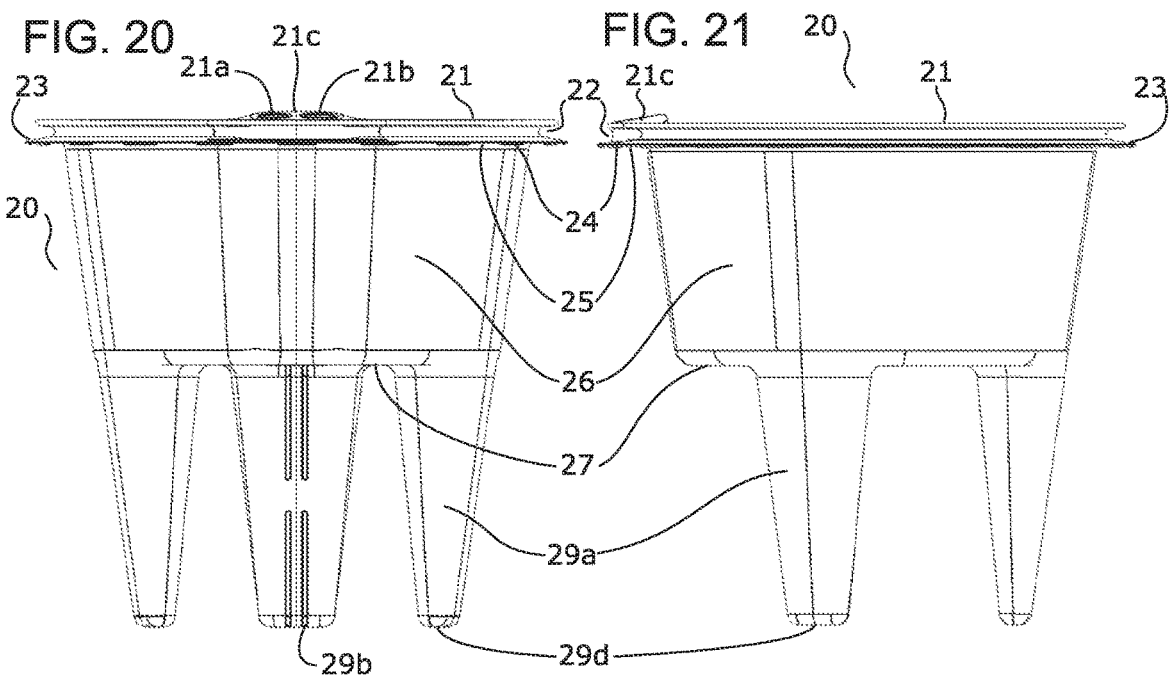
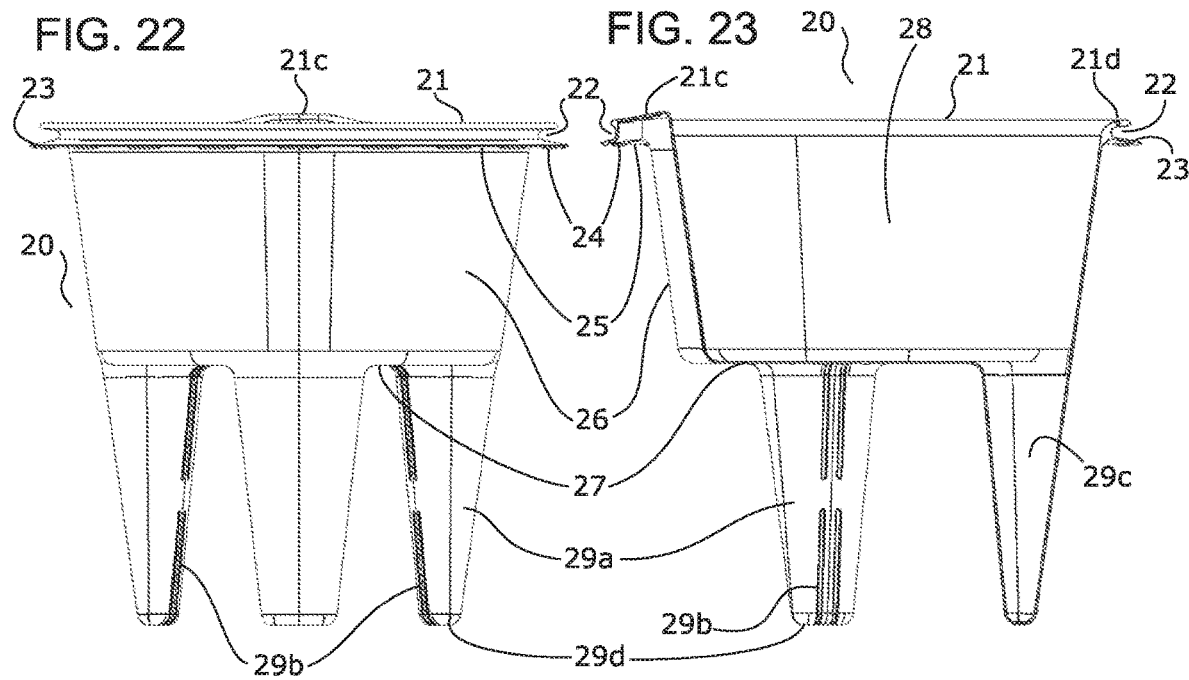

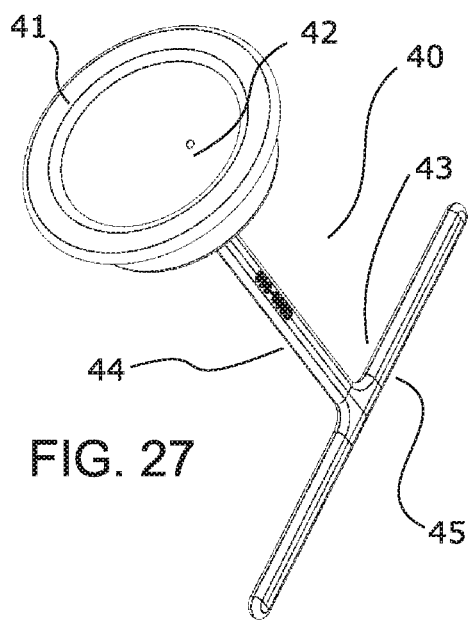
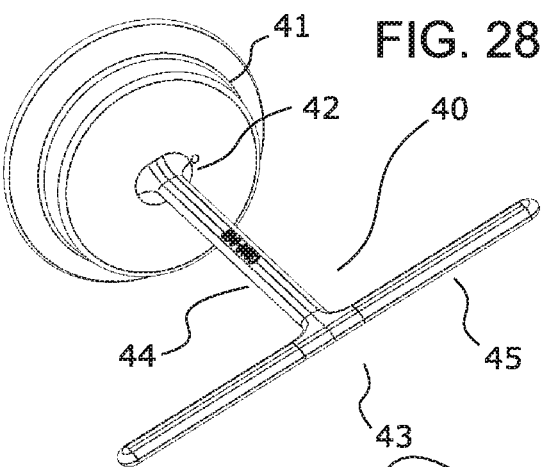
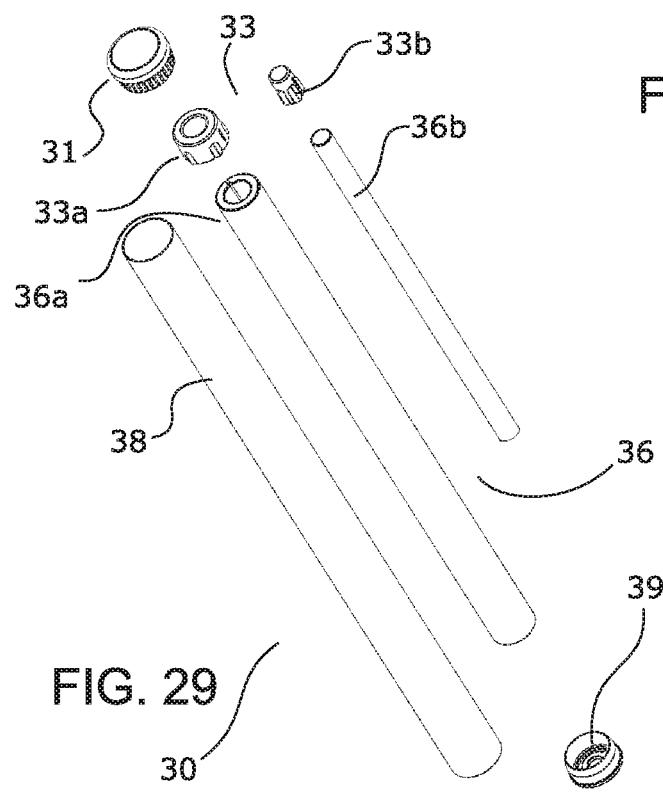
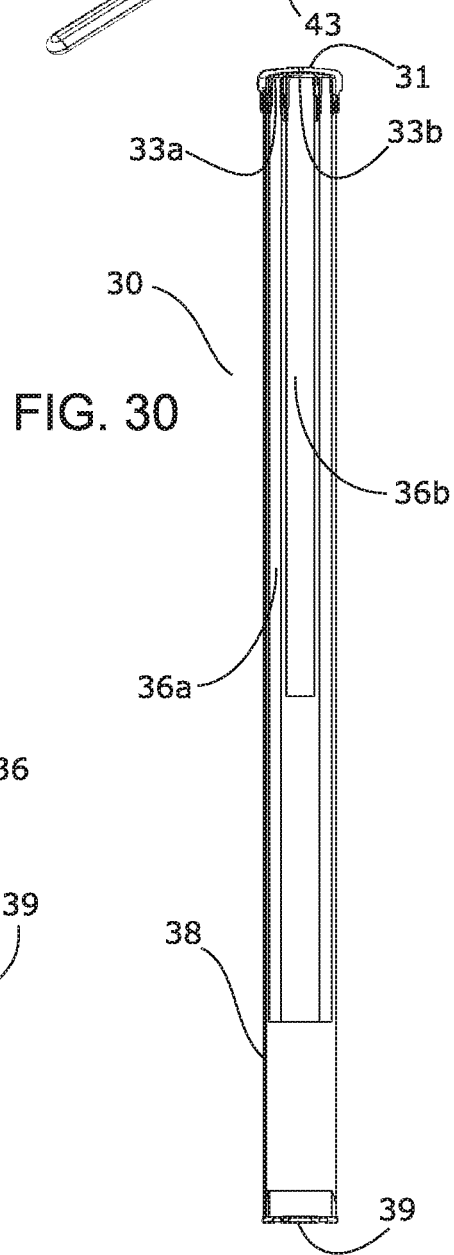

INSERTABLE PLANTER, SYSTEM, AND METHODS

FIELD OF THE DISCLOSURE

The present disclosure generally relates to the field of insertable planters, and methods for selling plants in such planters.

BACKGROUND

Planters come in many sizes and shapes, but it is up to the consumer to fill them with gravel and/or soil, plant the desired plant(s) in them, and replace the plant when it perishes. Some decorative planters may receive a planter insert, but the insert is generally simply placed on a flat floor in such a planter secured only by its weight from moving within the decorative planter.

The present disclosure seeks to simplify the manner in which end consumers can place new plants into container planters, minimizing the work done to add a planter insert to such a container. The present disclosure further provides a planter insert that can securely engage a container, and presents several novel methods of providing new plants to consumers utilizing such planter inserts.

SUMMARY OF THE DISCLOSURE

The following presents a simplified summary of the disclosure in order to provide a basic understanding of some aspects of the invention. This summary is not an extensive overview of every embodiment disclosed herein. It is intended to neither identify key or critical elements of the various embodiments nor delineate the scope of the disclosure. Its sole purpose is to present some concepts of the disclosure, in accordance with the various embodiments disclosed herein, in a simplified form as a prelude to the more detailed description that is presented later In some embodiments, an insertable planter system in accordance with the disclosed concepts may include a container and an insert. The container may include a rim, an outer wall comprising an inner surface, a bottom portion comprising a floor, wherein the inner surface and floor may define a liquid reservoir. The floor may further include a positioning structure. The insert may include a lip, a sidewall, and a bottom. The sidewall and bottom may define a plant chamber. The insert may further include a complementary supporting structure, such that the container receives the insert so that the insert can be rotated into a suitable orientation where the complementary supporting structure of the insert engages the positioning structure of the container.

In some embodiments, a container in accordance with the disclosed concepts may include a rim, an outer wall which may have an inner surface, and a bottom portion which may have a floor. The inner surface and floor may define a liquid reservoir. The floor may further include a positioning structure. The container may be capable of receiving a planter insert comprising a complementary supporting structure, such that the insert can be rotated into a suitable orientation where the complementary supporting structure engages the positioning structure.

In some embodiments, a planter insert in accordance with the disclosed concepts may include a top surface, a sidewall, and a bottom. The sidewall and bottom may define a plant chamber. The planter insert may further include a supporting structure such that the planter insert is capable of being inserted into a container that may have a complementary positioning structure, such that the planter insert can be rotated into a suitable orientation where the supporting structure of the planter insert engages the complementary positioning structure.

In some embodiments, a plant unit delivery method in accordance with the disclosed concepts may include the steps of: (1) providing an order form to a customer; (2) receiving an order from the customer for a plant; and (3) coordinating delivery of a first plant unit comprising a first plant that is disposed in soil inside a plant chamber of a first planter insert. The first planter insert may include a top surface, a sidewall and a bottom, where the sidewall and bottom may define a plant chamber of the first planter insert. The first planter insert may further include a supporting structure, wherein the first planter insert is capable of being inserted into a container planter comprising a complementary positioning structure, such that the first planter insert can be rotated into a suitable orientation where the supporting structure of the first planter insert may engage the complementary positioning structure.

In some embodiments, a computer, smartphone, or a system for delivering a plant in accordance with the disclosed concepts may include: a user input module, and a plant delivery coordination module. The user input module allow entry of an order from a customer, including order information that may include a request for delivery of a first plant. The delivery coordination module may receive the order information, and may transmit a request for delivery of a first plant unit to the customer. The first plant unit may include the first plant disposed in soil inside a plant chamber of a first planter insert. The first planter insert may include a top surface, a sidewall and a bottom, where the sidewall and bottom may define a plant chamber of the first planter insert. The first planter insert may further include a supporting structure, wherein the first planter insert is capable of being inserted into a container planter comprising a complementary positioning structure, such that the first planter insert can be rotated into a suitable orientation where the supporting structure of the first planter insert may engage the complementary positioning structure.

In some embodiments, a non-transitory computer readable medium storing instructions that, when executed by a computer, cause it to perform the steps of: (1) providing an order form to a customer; (2) receiving an order from the customer for a plant; and (3) coordinating delivery of a first plant unit comprising a first plant that is disposed in soil inside a plant chamber of a first planter insert. The first planter insert may include a top surface, a sidewall and a bottom, where the sidewall and bottom may define a plant chamber of the first planter insert. The first planter insert may further include a supporting structure, wherein the first planter insert is capable of being inserted into a container planter comprising a complementary positioning structure, such that the first planter insert can be rotated into a suitable orientation where the supporting structure of the first planter insert may engage the complementary positioning structure.

The following description and the annexed drawings set forth certain illustrative aspects of the embodiments of the disclosure. These aspects are indicative, however, of but a few of the various ways in which the principles of the disclosure may be employed and the various embodiments are intended to include all such aspects and their equivalents. Other advantages and novel features will become apparent from the following description when considered in conjunction with the drawings.

BRIEF DESCRIPTION OF THE DRAWINGS

The drawings, in which like numerals represent similar parts, illustrate generally, by way of example, but not by way of limitation, various embodiments discussed in the present document.

FIG. 5 illustrates a cross section of a third side view of the insertable planter system of FIG. 1.

FIG. 6 illustrates a cross section of a fourth side view of the insertable planter system of FIG. 1.

FIG. 7 illustrates a closer cross section side view of the insertable planter system of FIG. 1.

FIG. 8 illustrates a top perspective view of the container of the insertable planter system of FIG. 1.

FIG. 9 illustrates a bottom perspective view of the container of FIG. 8.

FIG. 10 illustrates a top view of the container of FIG. 8.

FIG. 11 illustrates a bottom view of the container of FIG. 8.

FIG. 20 illustrates a first side view of the insert of FIG. 16.

FIG. 21 illustrates a second side view of the insert of FIG. 16.

FIG. 22 illustrates a third side view of the insert of FIG. 16.

FIG. 23 illustrates a cross section of the second side view of the insert of FIG. 16.

FIG. 27 illustrates a top perspective view of the water cap of the insertable planter system of FIG. 1.

FIG. 28 illustrates a bottom perspective view of the water cap of FIG. 27

FIG. 29 illustrates an exploded top perspective view of the liquid level indicator of FIG. 1.

FIG. 30 illustrates a cross section of a side view of the liquid level indicator of FIG. 29.

DETAILED DESCRIPTION

Figure 1:
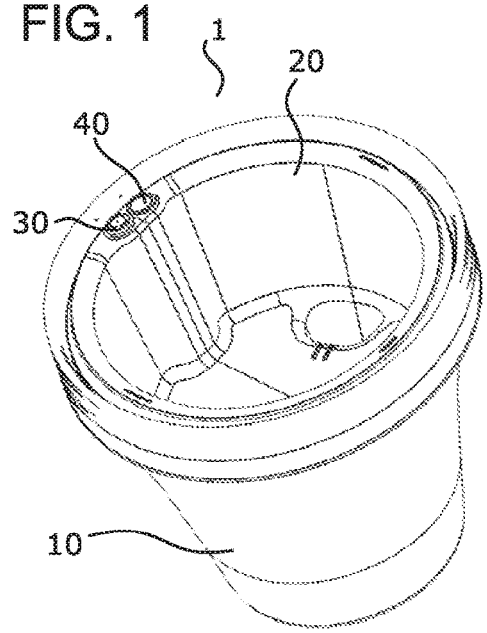
FIG. 1 illustrates a top perspective view of an insertable planter system, including a container, insert, liquid level indicator and fill cap; in accordance with the disclosed concepts.
Figure 2:
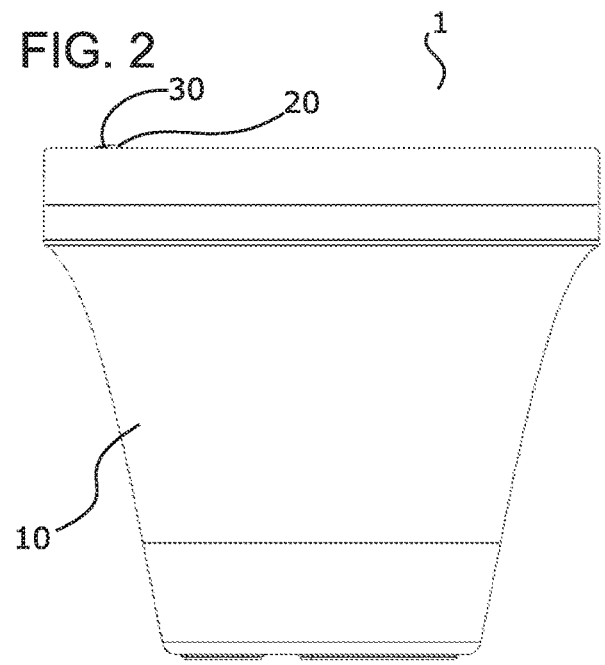
FIG. 2 illustrates a first side perspective view of the insertable planter system of FIG. 1.
Figure 3:
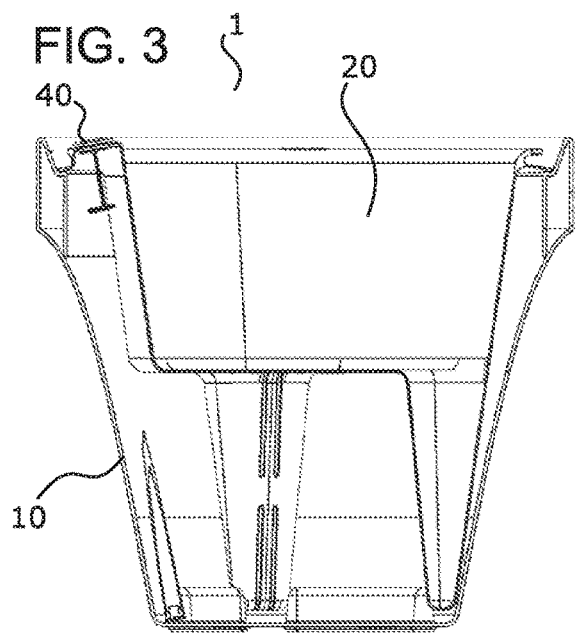
FIG. 3 illustrates a cross-section of a first side view of the insertable planter system of FIG. 1.
Figure 4:
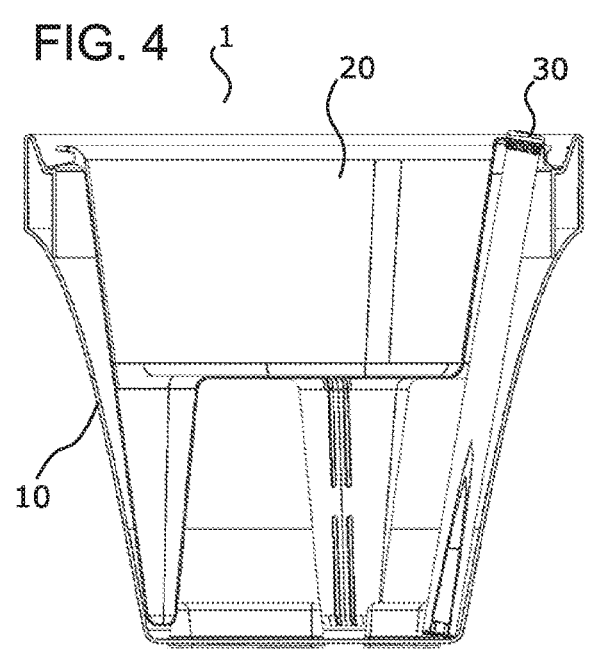
FIG. 4 illustrates a cross section of a second side view of the insertable planter system of FIG. 1.
Figure 12:
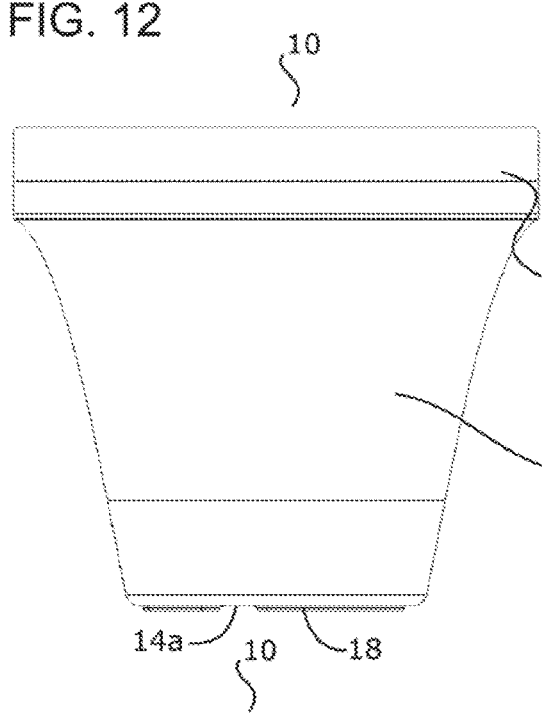
FIG. 12 illustrates a first side view of the container of FIG. 8.

In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that structural, logical, and electrical variations may be made without departing from the scope of the subject matter disclosed herein. The following detailed description is, therefore, not to be taken in a limiting sense, and the scope of the subject matter disclosed herein is defined by the appended claims and their equivalents. In the description that follows, like numerals or reference designators will be used to refer to like parts or elements throughout. In this document, the terms "a" or "an" are used, as is common in patent documents, to include one or more than one. In this document, the term "or" is used to refer to a nonexclusive or, unless otherwise indicated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In some embodiments, an insertable planter system in accordance with the disclosed concepts may include a container and an insert. The container may include a rim, an outer wall comprising an inner surface, a bottom portion comprising a floor, wherein the inner surface and floor may define a liquid reservoir. The floor may further include a positioning structure. The insert may include a lip, a sidewall, and a bottom. The sidewall and bottom may define a plant chamber. The insert may further include a complementary supporting structure, such that the container receives the insert so that the insert can be rotated into a suitable orientation where the complementary supporting structure of the insert engages the positioning structure of the container.

In some embodiments, a container in accordance with the disclosed concepts may include a rim, an outer wall which may have an inner surface, and a bottom portion which may have a floor. The inner surface and floor may define a liquid reservoir. The floor may further include a positioning structure. The container may be capable of receiving a planter insert comprising a complementary supporting structure, such that the insert can be rotated into a suitable orientation where the complementary supporting structure engages the positioning structure.

In some embodiments, a planter insert in accordance with the disclosed concepts may include a top surface, a sidewall, and a bottom. The sidewall and bottom may define a plant chamber. The planter insert may further include a supporting structure such that the planter insert is capable of being inserted into a container that may have a complementary positioning structure, such that the planter insert can be rotated into a suitable orientation where the supporting structure of the planter insert engages the complementary positioning structure.

In some embodiments, the positioning structure may be an asymmetric positioning structure. In some embodiments the complementary supporting structure may be an asymmetric complementary supporting structure. In some such embodiments the planter insert can be rotated into only one suitable orientation where the asymmetric positioning structure engages the asymmetric complementary supporting structure.

In some embodiments, the positioning structure may include at least one inner projection which may defines at least one recess, such that the at least one recess of the positioning structure is capable of receiving at least one complementary structure of the supporting structure. In some embodiments, the at least one inner projection may include a first inner projection, a second inner projection and a third inner projection, and the at least one recess may include a first recess a second recess and a third recess. In such embodiments the first recess may be capable of receiving a first foot of the at least one complementary structure of the supporting structure, the second recess may be capable of receiving a second foot of at least one complementary structure of the supporting structure, and the third recess may be capable of receiving a third foot of the at least one complementary structure of the supporting structure. In some embodiments the at least one inner projections are arranged in a segmented, annular pattern.

In some embodiments the positioning structure may include at least one recess, such that the at least one recess of the positioning structure are capable of receiving at least one foot of the supporting structure. In some embodiments, the at least one recess may include a first recess, a second recess, and a third recess such that the first recess may be capable of receiving a first foot of the at least one foot of the supporting structure; the second recess may be capable of receiving a second foot of the at least one foot of the supporting structure; and the third recess may be capable of receiving a third foot of the at least one foot of the supporting structure. In some embodiments, the at least one recess are arranged in a segmented, annular pattern.

In some embodiments, the insertable planter system may include a liquid level indicator.

In some embodiments, the complementary support structure may include at least one support, each of the at least one support may include a foot, such that each foot of the at least one support of the support structure may engage the positioning structure. In some embodiments each foot of the at least one support may be arranged in a segmented, annular pattern.

In some embodiments, the supporting structure may extend from the bottom of the insert.

In some embodiments, soil may be disposed in the plant chamber, and a live plant may be planted in the plant chamber. In some embodiments a removable cover may be attached to the top surface of the planter insert, the cover comprising an opening allowing the live plant to pass through the cover.

In some embodiments, a plant unit delivery method in accordance with the disclosed concepts may include the steps of: (1) providing an order form to a customer; (2) receiving a first order from the customer for a plant; and (3) coordinating delivery of a first plant unit comprising a first plant that is disposed in soil inside a plant chamber of a first planter insert. The first planter insert may include a top surface, a sidewall and a bottom, where the sidewall and bottom may define a plant chamber of the first planter insert. The first planter insert may further include a supporting structure, wherein the first planter insert is capable of being inserted into a container planter comprising a complementary positioning structure, such that the first planter insert can be rotated into a suitable orientation where the supporting structure of the first planter insert may engage the complementary positioning structure.

In some embodiments, the step of providing a method for receiving orders for plant users further allows a customer the option to select a subscription. In some embodiments, the first order received in the step of receiving a first order from the customer may include subscription information comprising a specified time interval. In some embodiments, the method further may also include the step of coordinating the delivery of a replacement plant unit to replace the previously delivered first plant unit at the specified time interval. The replacement plant unit may include a replacement plant that is disposed in soil inside a plant chamber of a replacement planter insert. The replacement planter insert may include a top surface, a sidewall, and a bottom, wherein the sidewall and bottom may define the plant chamber of the replacement planter insert. The replacement planter insert may also include a supporting structure, such that the replacement planter insert may be capable of being inserted into the container planter such that the replacement planter insert can be rotated into the suitable orientation where the supporting structure of the replacement planter insert engages the complementary positioning structure.

In some embodiments, the first plant unit and the replacement plant unit may be seasonally appropriate for a respective season in which each of the first plant unit and the replacement plant unit were delivered. In some embodiments, the step of establishing a delivery and replacement method is accomplished by providing the customer with access to an application that is capable of running on a computing device, and receiving from the computing device subscription information, including the regular specified time interval.

In some embodiments, a computer, smartphone, or a system for delivering a plant in accordance with the disclosed concepts may include: a user input module, and a plant delivery coordination module. The user input module allow entry of an order from a customer, including order information that may include a request for delivery of a first plant. The delivery coordination module may receive the order information, and may transmit a request for delivery of a first plant unit to the customer. The first plant unit may include the first plant disposed in soil inside a plant chamber of a first planter insert. The first planter insert may include a top surface, a sidewall and a bottom, where the sidewall and bottom may define a plant chamber of the first planter insert. The first planter insert may further include a supporting structure, wherein the first planter insert is capable of being inserted into a container planter comprising a complementary positioning structure, such that the first planter insert can be rotated into a suitable orientation where the supporting structure of the first planter insert may engage the complementary positioning structure.

In some embodiments, a non-transitory computer readable medium storing instructions that, when executed by a computer, cause it to perform the steps of: (1) providing an order form to a customer; (2) receiving an order from the customer for a plant; and (3) coordinating delivery of a first plant unit comprising a first plant that is disposed in soil inside a plant chamber of a first planter insert. The first planter insert may include a top surface, a sidewall and a bottom, where the sidewall and bottom may define a plant chamber of the first planter insert. The first planter insert may further include a supporting structure, wherein the first planter insert is capable of being inserted into a container planter comprising a complementary positioning structure, such that the first planter insert can be rotated into a suitable orientation where the supporting structure of the first planter insert may engage the complementary positioning structure.

FIGS. 1-7 illustrate a planter system that may include a container 10, a planter insert 20, a liquid level indicator 30 and a water cap. The container 10 may be made of plastic, terracotta, metal, wood, composite materials, or any other suitable material or materials know in the art or to be developed. The container 10 may be designed to be artistically pleasing, and as described in greater detail below, may be designed to interface with a particular type of planter insert. Similarly, the planter insert 20, may be made from any suitable material or materials known in the art or to be developed, including the materials listed for the container. It may be advantageous to form the planter insert 20 from a sturdy, but light weight material, in order to facilitate insertion and removal of the planter insert 20 from the container 10. It may further be advantageous for the planter insert 20 to be made from a biodegradable material.

Figure 14:
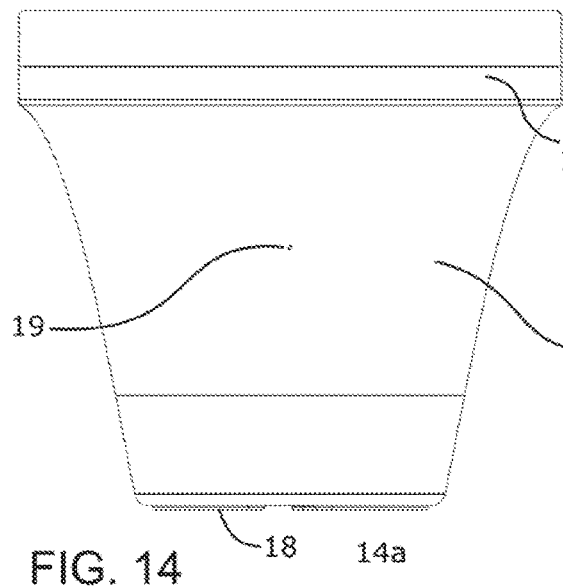
FIG. 14 illustrates a second side view of the container of FIG. 8.
Figure 13:
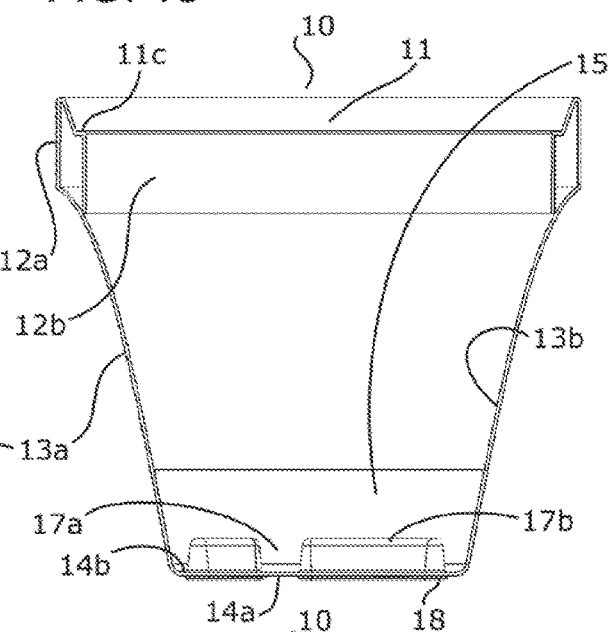
FIG. 13 illustrates a cross section of the first side view of the container of FIG. 8.
Figure 15:
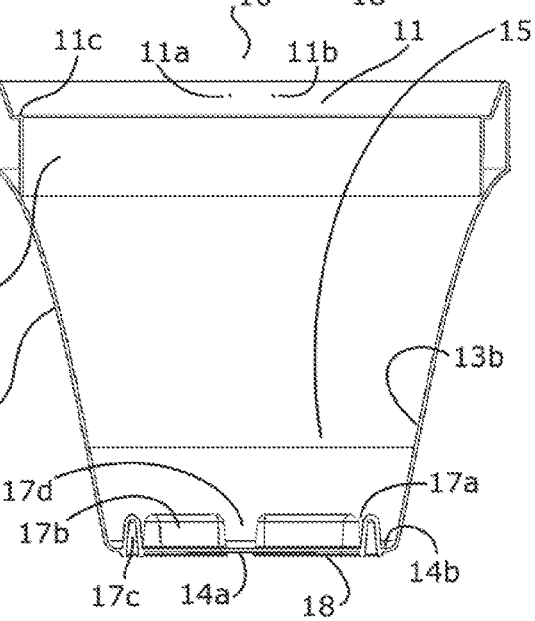
FIG. 15 illustrates a cross section of the second side view of the container of FIG. 8.
Figure 16:
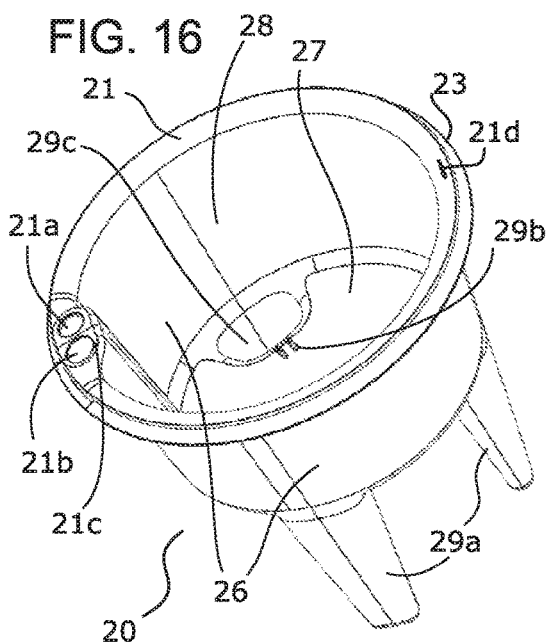
FIG. 16 illustrates a top perspective view of the insert of the insertable planter system of FIG. 1.
Figure 17:
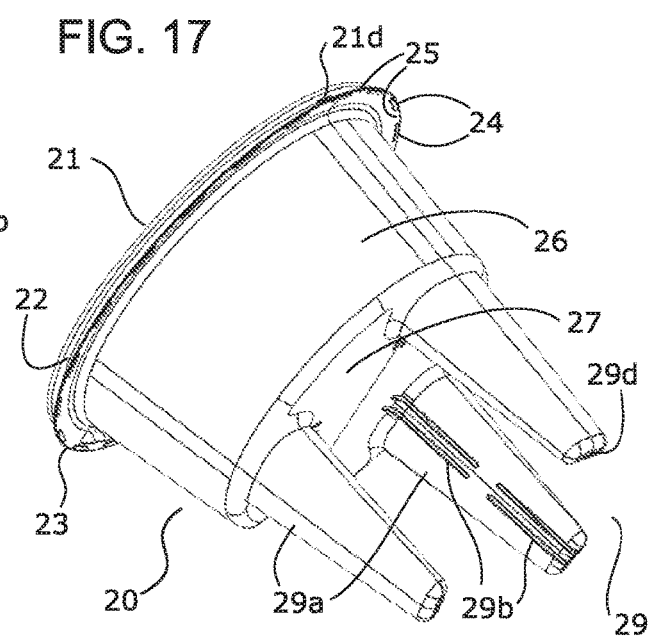
FIG. 17 illustrates a bottom perspective view of the insert of FIG. 16.
Figure 18:
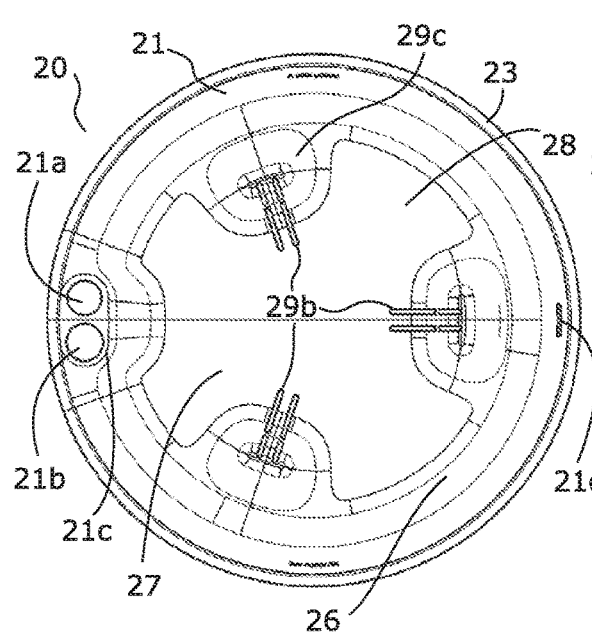
FIG. 18 illustrates a top view of the insert of FIG. 16.

FIGS. 8-15 illustrate various views of container 10 of the planter system 1. Container 10 may have a rim 11, an outer wall which may include a wide portion 12 and a tapered portion 13, and a bottom portion 14. As shown in FIGS. 7, 8, 13 and 15, rim 11 may have a generally angled "L" shape to facilitate draining water and other liquids into the liquid reservoir 15, though any suitable shape known in the art may be used. Rim 11 may be provided with positioning markers 11a, 11b to assist in properly orienting a planter insert 10. For example position ins marker 11a may be disposed at a location on the rim that lines up with liquid level indicator 30, while positioning marker 11b may be disposed on the rim so that it lines up with water cap 40, when a planter insert 20 disposed within, and properly oriented relative to container 10. Rim 11 may further be provided with rim base 11c, as the bottom of the "L" shape to receive lip 23 and/or the spacer projections 24 of planter insert 20. As illustrated in FIG. 7, in embodiments having spacer projections 24 on the bottom of lip 23, the spacer projections 24 may separate the lip 23 from the rim base 11c forming drainage gaps 25 therebetween, which allows rain water and other liquids to drain into the liquid reservoir 15 located within container 10. Wide portion 12 may include an outer surface 12a and an inner surface 12b. The inner surface 12b may descend from rim base 11c, or the edge of rim base 12b may form the inner surface 12b of the wide portion, leading directly to the tapered portion. The between the outer surface 12a and the inner surface 12b may be solid, or as shown in FIGS. 13 and 15, hollow, as desired by the person implementing the disclosed concepts.

As shown in FIGS. 8-15, Container 10 may further have a tapered portion 13 which may generally conical in shape, and which may taper from the wide portion 12 down to the bottom 14. Persons of skill in the art will recognize that the use of a tapered portion 13 is optional and that container 10 any suitable shape and size desired by someone implementing the disclosed concepts may be used, including but not limited to generally conical, cylindrical, spherical, rectangular of cubical shapes. The tapered portion may have an outer surface 13a and an inner surface 13b.

Container 10 may be provided with a water outlet, or an outlet marker 19 allowing a consumer to drill a water outlet in a suggested location. The outlet or outlet marker 19 may be disposed at an optimal location given the design of the planter insert 20 and/or liquid level indicator 30 that are intended to be used with container 10. For example, as shown in FIGS. 8, 9 and 14, outlet marker 19 may be disposed on the outer surface 13a of the tapered portion 13.

The bottom 14 may include a bottom surface 14a, and an inner surface/floor 14b. The inner surfaces of the container, including inner surface 13b and floor 14b may define a liquid reservoir, where water, plant nutrients and/or other liquids may be retained to nourish a plant placed in a planter insert 20 disposed within container 10. The bottom surface may also include positioning structures 17. Positioning structures may take any form known in the art or to be developed that can facilitate the positioning and or securing of a planter insert 20 within the container 10. The positioning structures may contain recesses 17a and/or inner projections 17b. As used herein, recesses 17a, 17d may be recesses formed in the floor 14b of the bottom 14 or in inner projections 17b, or they may be the spaces or gaps between inner projections 17b, as shown in FIGS. 8 and 10. For example, FIG. 10 illustrates an embodiment of the container 10 where the positioning structure has four inner projections 17b forming four recesses 17a, 17d, where one of the recesses is a liquid level indicator recess 17d, while the other recesses 17a are capable of receiving a support structure 29, or more specifically, the feet 29d of a support structure 29. Persons of skill in the art will recognize that the disclosed concepts can be practiced in various ways, including merging/connecting all four of the inner projections 17b into a single inner projection, while maintaining the recesses 17a, 17d where they are located, or removing the inner projections altogether and having the recesses 17a, 17d formed in the floor 14b. Any suitable positioning structure known in the art or to be developed may be practiced with the disclosed concepts. The container may further have bottom projections 18 projecting downwards from the bottom surface 14a, and lifting the bottom surface off of the ground. The bottom projections and inner projections may form projection cavities 17d, or they may be solid.

As discussed in greater detail below, the positioning structure 17 and the support structure 29 it engages should have complementary designs that secure the planter insert 20 to the container 10 such that incidental movement of one relative to the other is minimized. The positioning structure 17 maybe symmetric, such that more than one orientation of a planter insert 20 will allow the positioning structure 17 to engage and secure the support structure 29 of the planter insert. Alternatively, an asymmetric positioning structure 17 may be used to interface with an asymmetric support structure 29 such that only one orientation of the planter insert 20 relative to the container 10 properly allows the positioning structure 17 to engage the support structure 29. FIGS. 3-6 illustrate various cross-sectional views showing the interface between the exemplary support structure 29 and both the exemplary positioning structure 17 and the exemplary liquid level indicator 30.

Separate and apart from the disclosed concepts, container 10 can also be used as a regular planter, without a planter insert 20, and without a liquid level indicator 30. Container 10 may be provided with drain markers 16 on the bottom surface 14a and/or floor 14b so that consumers who wish to use container 10 as a regular planter can drill drains through the bottom 14 at those locations. For example, as illustrated in FIG. 10, the inner projections 17b have different sizes from one another forming an asymmetric set of recesses 17a, 17d, such that there is only one orientation of the exemplary planter insert 20, wherein the support structure 29 of the planter 20 can properly engage the container such that bottom of the liquid level indicator 30 is disposed within the liquid level indicator gap 17d, and the feet 29d of the support structure 29 are disposed within their respective recesses 17a. In all other orientations, the support structure 29 of the planter insert 20 may not properly engage the positioning structure 17. Accordingly, the positioning markers 11a, 11b are placed on the rim 11 in a location to assist a consumer in properly orienting the planter insert 20.

FIGS. 16-24 illustrate various views of an embodiment of planter insert 20, which can be received by container 10. The planter insert may have any suitable desired design, shape, and size, and may be made from any suitable material. The planter insert 20 is preferably sized and shaped to fit snugly within container 10, and may be made from a light, resilient plastic, or any other suitable material or materials.

Figure 24:
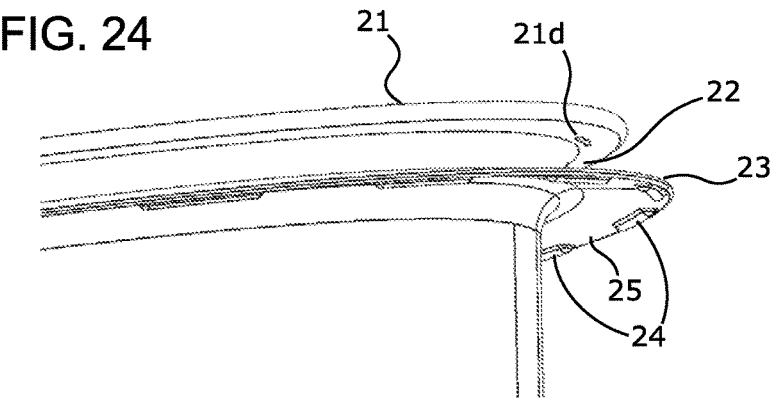
FIG. 24 illustrates a close-up bottom perspective view of the insert of FIG. 16.

Planter insert 20 may have a top surface 21 and lip 23. In some embodiments lip 23 may be located at the outer edge of top surface 21. In other embodiments, and as shown in FIGS. 16-24, lip 23 may be separated from top surface 21 by a finger groove, 22, which may facilitate a person lifting, maneuvering and/or positioning of the insertable planter relative to the container. The shape of top surface 21 and lip 23 is preferably complementary to the shape of container 10, such that the lip can rest easily on the rim surface 11 of the container. As shown in FIGS. 16-24, the shape of the top surface 21, lip 23 and rim surface 11 may be generally circular. In other embodiments the shape of these structures may be rectangular, elliptical, triangular, or may be any other suitable shape desired by a person of ordinary skill in the art. Lip 23 may extend outwards further than top surface 21, though embodiments where the reverse is true are within the scope of the disclosed concepts. The spacer projections 24 may be disposed on the bottom surface of lip 23, to separate the lip 23 from the rim surface 11 of the container 10. Drainage gaps 25 may further be disposed between the spacer projections 24. This may allow rain water and/or other liquids to drain into the liquid reservoir 15 of the container 10 when the, as gravity pulls such liquids down from the top surface 21, lip 23 and rim surface 11 through the drainage gaps 25. FIG. 24 illustrates a close-up view of the top surface 21, including tag slot 21d, groove 22 and lip 23, including the spacer projections 24 and drainage gaps 25 of the planter insert 20.

In some embodiments, the top surface 21 may include a water intake hole 21 allowing a consumer to refill, or otherwise access the liquid reservoir, for example, to add nutrients, chemicals or to insert tools (hoses or sensors) into the liquid reservoir. Top surface 21 may further be provided with a liquid level indicator hole 21b, which may receive a liquid level indicator 30, and allow the liquid level indicator to be inserted into the liquid reservoir. In some embodiments, the water intake hole 21 and the liquid level indicator hole be provided on a shelf 21c of top surface 21. The shelf 21c may have wider surface are than the rest of the top surface 21. Top surface 21 may also be provided with a tag slot 21d, which may allow a plant identifier tag to be inserted into the tag slot 21d. The tag slot 21d may be located anywhere on the top surface, including but not limited to opposite the shelf, as shown in FIGS. 16-23, or adjacent to same on either side.

The planter insert may have a floor 27 and one or more side walls 26, both the floor and the side walls having an inner surface and an outer surface. The inner surface of the sidewalls 26 and the floor 27 may define a plant chamber 28, where gravel, soil, plants, and the like may be disposed. The outer surface of the side walls 26 and floor 27, together with the inner surfaces of the container may define an enclosed interior chamber, including a liquid reservoir 15 when the planter insert is disposed within a container.

The planter insert 20 may further include a support structure 29. The support structure 29 is preferably designed, shaped and sized to be complementary to the positioning structures 17 in the container 10, such that they engage with each other and provide some level of security or resistance to relative movement between the planter insert 20 and the container 10. Persons of skill in the art will recognize that any suitable design and shape of support structure 29 and a corresponding positioning structure 17 may be used in accordance with the disclosed concepts. The support structure 29 may be symmetric, such that the planter insert 20 may be rotated within the container 10 such that the support structure 29 may engage the positioning structure 17 in multiple orientations. Alternatively, the support structure 29 may be sized, shaped or arranged asymmetrically, such that only one orientation of the planter insert 20 relative to the container 10 exists where the support structure 29 of the planter insert 20 properly engages the positioning structure 17 of the container 10.

For example support structure 29 may include one or more legs 29a. Each leg 29a of support structure 29 may include one or more feet 29d, which may be sized and shaped in order to engage complementary recesses 17a in the positioning structure 17. The support legs 29a may further be hollow, having a cavity 29c disposed within the leg 29a. Soil, gravel and other materials may be disposed within this cavity 29c, that may absorb and transport liquid from the liquid reservoir into the plant chamber where the plants roots may access same. To facilitate this, the support legs may be provided with water intakes 29b, in the form of slots (as shown in FIGS. 16-23), holes, perforations, or any other suitable structure that allows liquid to enter the cavity 29c. As further shown in FIGS. 16 and 19, the water intakes 29b may also be disposed in the floor 27 of the planter insert 20.

As shown in FIGS. 16-26, the support legs 29a may be arranged in an annular, or substantially annular arrangement, to complement a similar arrangements of recesses in the positioning structure 17 of the container 10. The arrangement of the support legs 29a may be symmetric, such that the planter insert 20 may be rotated within the container 10 such that any foot 29d in the support structure 29 may engage any recess 17a in the positioning structure 17. Alternatively, as shown in FIGS. 16-26, the support legs 29a and their feet 29d may be sized, shaped or arranged asymmetrically, such that the feet 29d of each support leg 29a can only engage the recesses 17a of the positioning structure in only one orientation of planter insert 20 relative to the container 10.

As also shown in FIGS. 16-26, the feet 29d of the support legs 29a may be sized and shaped to engage the recesses 17a of the positioning structure, and to fit within the gaps between the inner projections of the positioning structure. Persons of skill in the art will recognize that the complementary structures of the positioning structure 17 and the support structure 29 can be reversed, modified and implemented in any desired way known in the art or to be developed. For example the inner projections 17b of the positioning structure 17 can be designed to engage with corresponding recesses in the support structure 29, and/or the support legs 29a. The support structure 29 can be provided with a single, substantially conically shaped leg having multiple feet/projections (or recesses) that engage recesses 17a (or projections 17b) in the positioning structure 17. Each such embodiment can have some level of symmetry, or otherwise allow the support structure 29 to engage the positioning structure 17 in multiple orientations of the planter insert 20 relative to the container 10. Alternatively each such embodiment can be asymmetric, or otherwise allow the support structure 29 to engage the positioning structure 17 in only one orientation of the planter insert 20 relative to the container 10. Again, any suitable design of the support structure 29 and the positioning structure 17 known in the art or to be developed can be used in accordance with the disclosed concepts.

Figure 25:
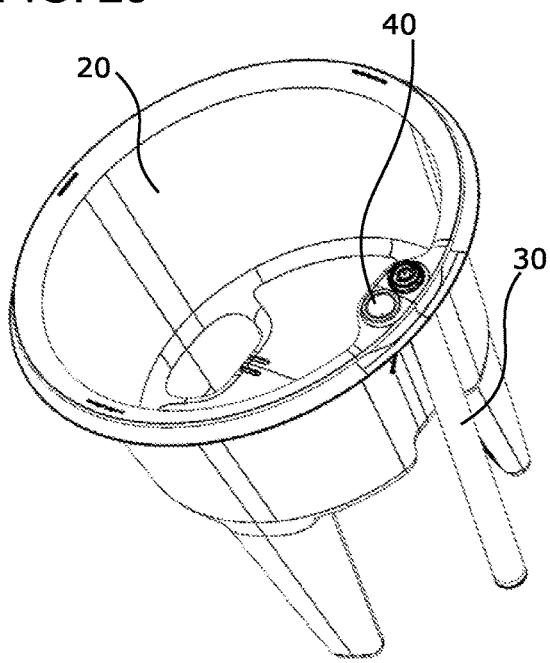
FIG. 25 illustrates a top perspective view of the insert, liquid level indicator and water cap of the insertable planter system of FIG. 1.
Figure 26:
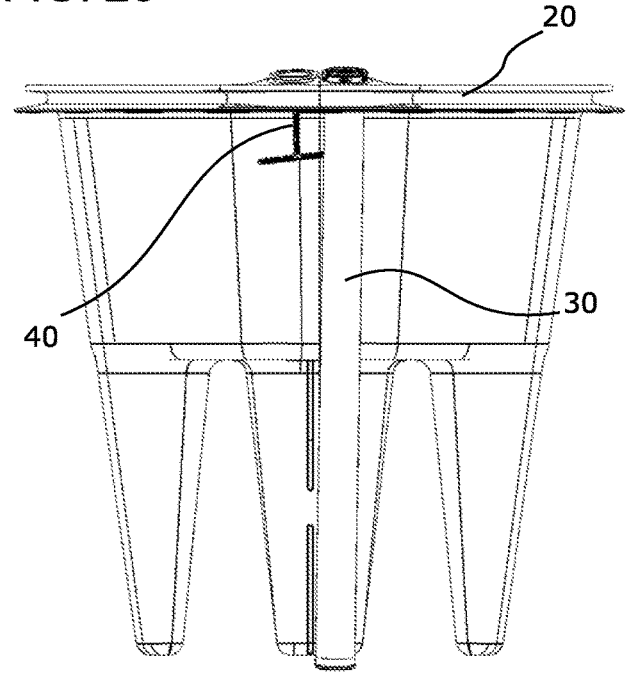
FIG. 26 illustrates a side view of the insert, liquid level indicator and water cap of FIG. 16.

FIGS. 25 and 26 illustrate views of the planter insert 20 with a liquid level indicator 30 and a water cap 40 installed therein. As shown in FIGS. 25 and 26, liquid level indicator 30 may be disposed in liquid level indicator hole 21b. Any suitable liquid level indicator 30 known in the art or to be developed may be used accordance with the disclosed concepts, including, but not limited to the liquid level indicator shown in FIGS. 29 -30 and described below, the liquid level indicators described and claimed in U.S. Pat. No. 9,872,446, U.S. Patent Publication No. 2018/0116136, and U.S. patent application Ser. No. 15/955,189, each of which is incorporated herein by reference in its entirety. Similarly, water cap 40 may be disposed in water intake cap hole 21b. Any suitable water cap known in the art or to be developed may be used in accordance with the disclosed concepts.

FIGS. 27 and 28 illustrate an exemplary water intake cap 40. The water cap 40 may have a top portion 41 that is preferably sized to fit snugly and detachably in the water intake hole 21a. The top portion 41 may further have a rim having that is larger than the water intake hole 21a to prevent the water intake cap 40 from falling through the water intake hole 21a and into the liquid reservoir 15. As shown in FIG. 27 the top portion may further have a top surface depression to facilitate gripping, lifting or securing the water cap 40 to or from the water intake hole 21a. The water cap may further be provide with an air hole 42, to allow it to facilitate insertion and removal of the water cap 40 in the water intake hole 21a by preventing or removing any pressure differential between the interior chamber of the planter system 1, and the outside atmosphere.

The water cap 40 may further have a securing structure 43 to prevent the water cap 40 from completely falling out of the water intake hole 21a when the water cap is "uncapped" from same. Any suitable securing structure known to a person of skill in the art, or to be developed may be used in accordance with the disclosed concepts. In the exemplary embodiment shown in FIGS. 27 and 28, the securing structure 42 comprises a neck 44 and a cross-bar 45, and may be made from an elastically resilient material such that it can be bent to be inserted or removed from the water intake hole 21a, but that it maintains its shape sufficiently to prevent it from accidentally falling out of same. The water cap is preferably made of plastic, though any other suitable material may be used.

FIGS. 29 and 30 illustrate an exemplary liquid level indicator 30. Again, any suitable liquid level indicator may be used with the disclosed concepts. The liquid level indicator may include a flag caps 33 attached to floating pushrods 36 disposed within a shell 38. The liquid level indicator 30 may further include a top cap 31 and a bottom cap 39. Either the shell 38, the bottom cap 39 or both may be provided with inlets, or may be made from a porous material, to allow liquid in the liquid reservoir 15 to enter the liquid level indicator 30. For example, as shown in FIG. 29, bottom cap 39 may be provided with a hole in the bottom. The top cap may also be provided with an air hole to allow air to enter or exit the liquid level indicator as the liquid reservoir is being filled or emptied. The components of the water level indicator may be made from any suitable material known in the art or to be discovered within the scope of the disclosed concepts.

Figure 19:
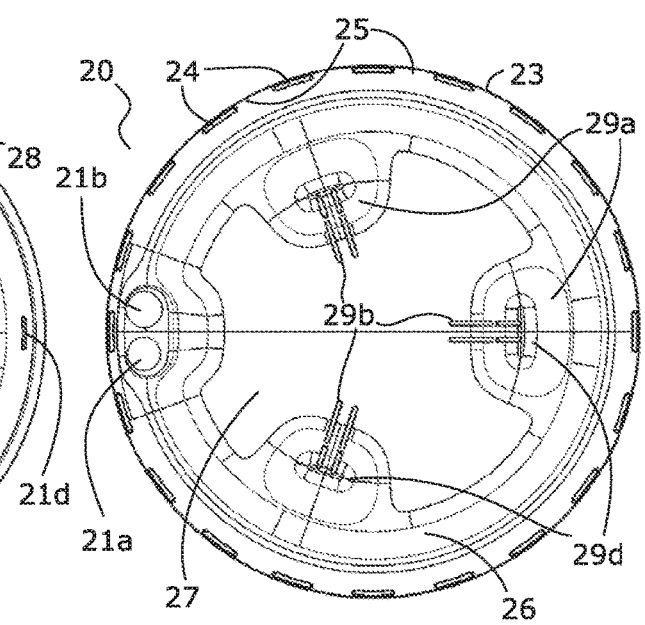
FIG. 19 illustrates a bottom view of the insert of FIG. 16.

The exemplary embodiment includes a large flag cap 33a and a smaller flag cap 33b, attached to a large floating pushrod 36a and a small floating pushrod 36b. The flag caps may be integrally made with the floating pushrods, or may be separate pieces, as shown in FIG. 19. As the liquid reservoir 15 is filled, when the liquid level indicator 40 is disposed in the planter system 1, the rising liquid in the liquid reservoir 15 pushes the floating pushrods rise towards the top cap 31. The floating pushrods 36, 36a, 36b may be sized and shaped to reach the top of the water level indicator at different levels. For example, the larger floating pushrod may reach the top of the water level indicator when the liquid reservoir is at a first level, such as 25%, 33%, 50%, 66% or 75% full, or any other desired level, and the smaller floating pushrod may reach the top of the water level indicator when the liquid reservoir is at a second level, such as 90% or 100% full. Persons of skill in the art will recognize that more than two floating pushrods and/or flag caps may be used, and that a person of ordinary skill in the art has great flexibility for implementing a liquid level indicator as desired within the scope of the disclosed concepts. The flag caps 33, 33a, 33b may be provided with spacers to reduce friction between the flag caps 33, 33a, 33b and the shell 38, floats 36, 36a, 36b, and each other.

The planter system 1 may be designed such that the container 10, liquid level indicator 30 and water cap 40 are intended to be kept by a consumer while the planter insert 20 is designed to be disposable and replaceable. Accordingly, the container 10, liquid level indicator 30 and water cap may be sold as a kit to consumers, while the planter inserts are sold or licensed to plant growers and sellers. In this manner, a plant seller may grow a plant 2 in a planter insert 20, and then sell the plant 2 to any owner of a suitable container 10. The consumer purchasing the plant 2 may then purchase a pre-planted plant 2, in a planter insert, and simply position the planter insert 20 within the container 10, and keep the plant for its lifespan, or any other desired amount of time, time interval or term (these terms may be used interchangeably), such a season, periodically refilling the liquid reservoir with water and/or plant food as directed by the seller or as indicated by the liquid level indicator. Once the term has expired, they can simply lift the planter insert 20 out of the container 10 and either dispose of the plant 2 and planter insert 20, or give it to a plant disposal or recycling service provider. This may minimize the maintenance work that the consumer has to perform, while keeping healthy plants on display at the desired locations. Any suitable time interval may be selected, including but not limited to bimonthly, monthly, semi-monthly, quarterly, etc.

Figure 31:
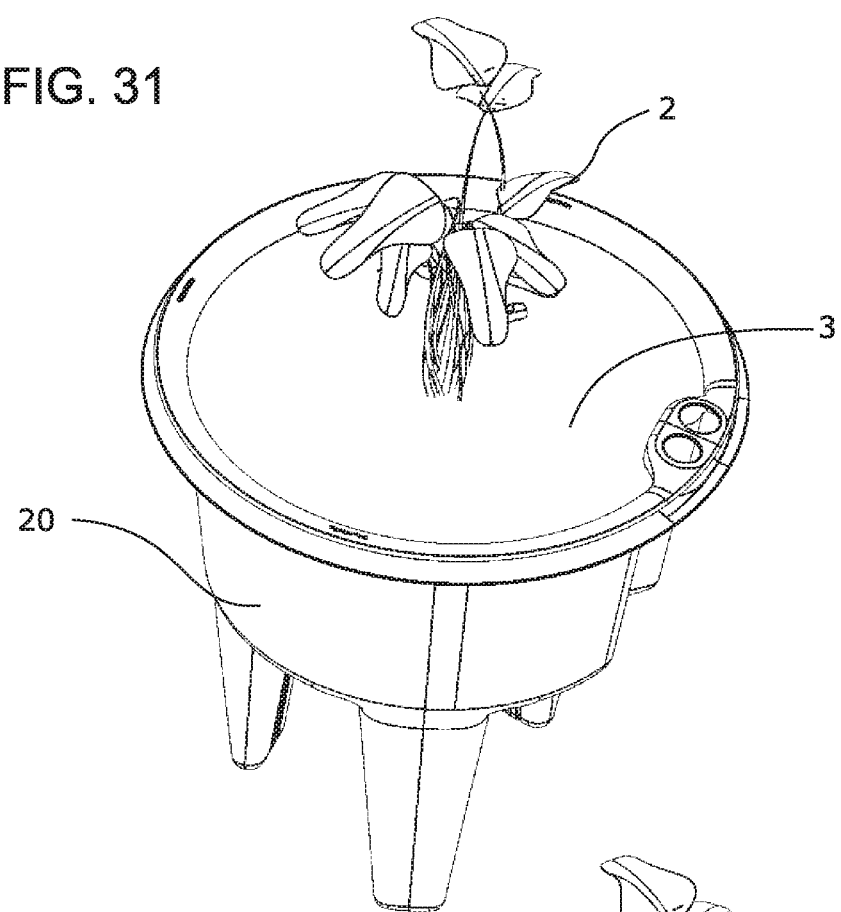
FIG. 31 illustrates a top perspective view of the insert of FIG. 16, filled with soil, and provided with a plant and a mesh cover.
Figure 32:
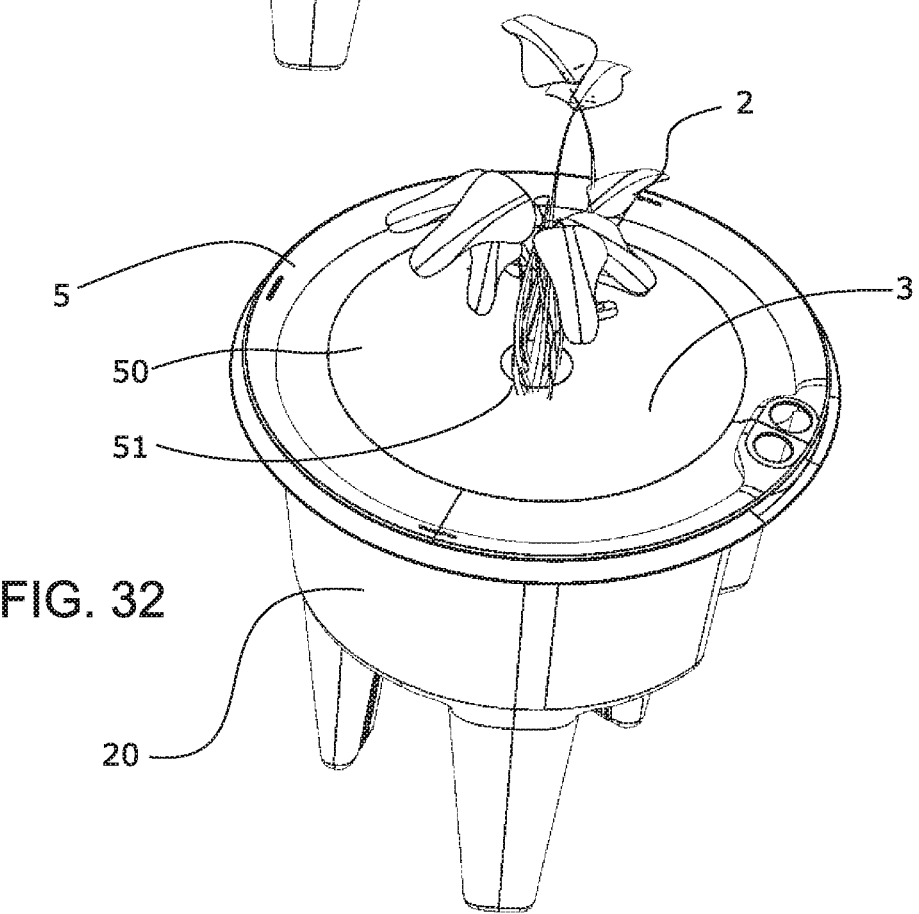
FIG. 32 illustrates a top perspective view of the insert of FIG. 16, filled with soil, and provided with a plant and a mesh cover.

FIG. 31 illustrates a planter insert 20 with a plant 2 and soil 3 disposed within same. As discussed above plant 2 may be pre-planted in soil 3, with or without gravel, nutrients and other materials or chemicals and grown to a desired level within a planter insert 20. The plant 2 may then be sold together with the planter insert 20 to any consumer who has a suitable container 10. As shown in FIG. 32, a cover 5 may be provided with planter insert 20 to help keep the soil 3 and other materials within the planter insert 20 while the plant 2 and planter insert are being delivered to or transported by a purchaser. The cover 5 may include a mesh 50 or thin film or foil, and be provided with a cutout 51 to allow the plant to grow. The cut out 51 may be designed into the cover 5, or may simply be one or more cuts into the material of the mesh 50, film or foil.

Figure 33:
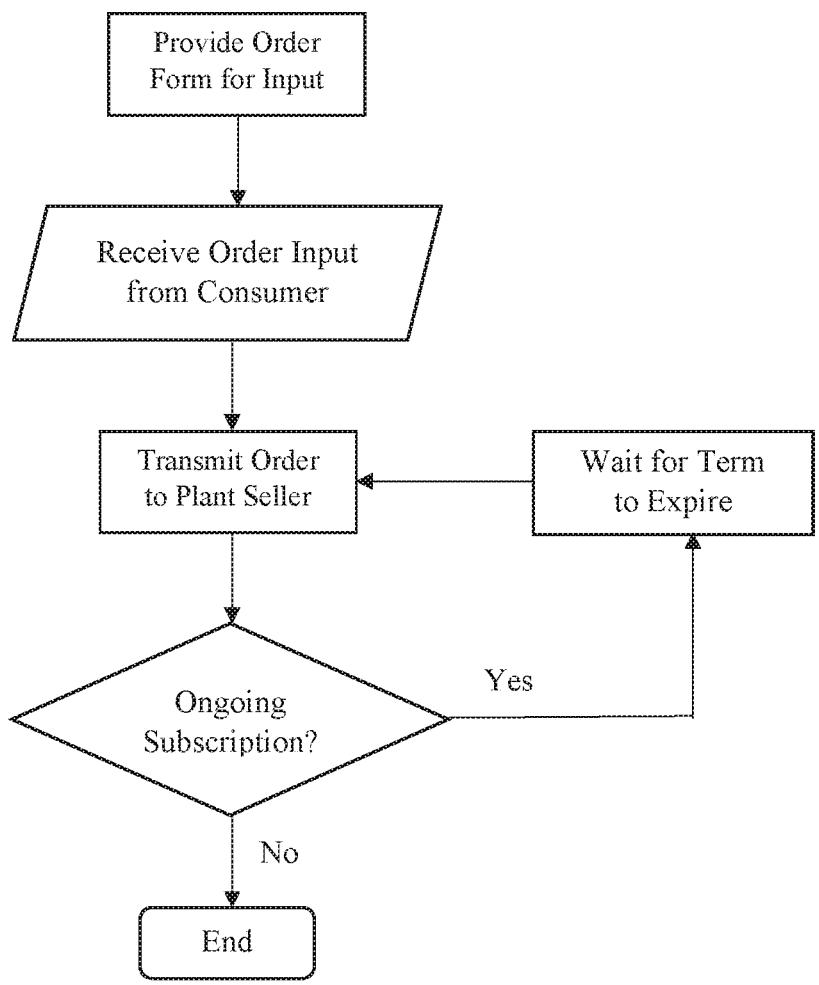
FIG. 33 illustrates a flow chart of the steps in a method for distributing plants in accordance with the disclosed concepts.

FIG. 33 illustrates an exemplary business method in accordance with the disclosed concepts. Specifically, a person implementing the disclosed concepts may first provide an order form to receive user input. The order form may be provided in any manner that is known in the art or that will be developed. For example, the order form may be a physical order form on paper, or another tangible medium that may be made available to consumers at a nursery, or any other plant retailer. A consumer can fill out the form and submit it to the seller. Alternatively order forms can be provided to a sales persons or distributors who will have contact with the consumers and can receive the input from the consumers telephonically, or by a computer or other data source. Order forms can also be provided electronically to consumers directly, via websites, smart phone applications, or kiosks located in nurseries or brick and mortar stores that are accessible by consumers. Order forms may include input fields to receive any of the exemplary consumer input described below.

The next step in the method is to receive the consumer input, which may include order information, such as the consumers name, address and other contact information, the plant information, which may include the identity of the plant (or plants) which a user wishes to purchase, and any details about arrangement of the plant(s) within the planter insert 20; delivery information, including whether the plant is to be picked up or delivered, a delivery address and preferred courier or method of delivery, instructions for delivery, etc. If the consumer wishes to purchase a recurring subscription of plants, the user input may include subscription information, including plant information for the various terms of the subscription, a term for replacing the plants ordered in the subscription, and a duration for how long the subscription will run. For example, a consumer may elect to have a year-long subscription with plants delivered at a quarterly term, and choose seasonal plants for each term. Budgetary information, indicating the amount that he consumer is willing to spend may also be provided.

Seasonal plants may vary by zone and in view of other environmental factors, such as sunny or shaded plant locations. Examples of seasonal plants include but are not limited to the lists that follow. For the winter/holiday season seasonal may plants include: poinsettia, diamond frost euphobia, and paperwhites (white narcissus). For early spring or spring, seasonal plants may include erica, heuchera, viola, acuba, pansy, acorns grass, red twig dogwood, dystilum, astilbe, lobelia, ajuga, camellia, carex grass, bulb mixtures (tulips, daffodils, etc.), sutera, golden arborvitae, dianthus, erysimum, calibrachoa, verbena, lamium, azalea, geranium, petunia, cordyline, angelonia, scaevola, flowering vinca, impatiens, cyperus grass, torenia, hydrangea, hosta, ephorbia, begonia, lettuce, kale, and mixes of same, and herb mixtures. Summer seasonal plants may include geranium, petunia, lantana, cordyline, calibrachoa, verbena, Angelonia, scaevola, sweetpotato vine, caladium, begonia, euphobia, hosta, heuchera, lamium, impatiens, cyperus grss, torenia, agapanthus, lantana, dipladenia, cordyline, capret rose, evolvus, red yucca, plumbago, melampodium, tomato, basil, and thyme. Fall seasonal plants may include artemesia, calendula nemesia, canna browalia, argyranthemun, panicum, petunia, lobularia, carex, euphobia, heuchera, coleus, lamium, aster, sedum, verbena, rose, salvia, calibrachoa, pansy, vinca vine, nemesia, begonia, ephorbia, camellia, carex grass, and microgreens. Consumers may identify specific plant(s) that they want for each term of the subscription, or they may simply elect a type of seasonal plant or seasonal plant arrangement to be delivered. Suggestions may be provided to the consumer based on the term, duration, and budgetary or options selected by the consurmer.

If the order includes an immediately deliverable order, the next step in the method is to transmit that order information to the retailer, seller or distributor that provides the plant and to arrange for the delivery of the plant(s) 2 in a planter insert 20 as described above in accordance with the disclosed concepts. This can handled electronically, by email, or via entering the order into a database to which the plant provider has access. Alternatively, this step be performed physically by handing the order form to an employee within a nursery or retailer that can select the appropriate plant 2 planted in a planter insert 20.

If the order information includes subscription information, that information can be filed, whether electronically in a database, or physically, and/or provided to the plant provider. The plant provider can then use the subscription information to plan their growing season to ensure that the correct plants 2 are planted in planter inserts 20 and available for delivery during the term for which they are requested. When the previous term is expiring, the plant provider may receive a notification that it is time to deliver the next plant 2 to the consumer in accordance with the subscription. As the duration of the subscription nears the end, the consumer may be provided with the option to renew their subscription, and to provide additional order information for the ensuing terms if the subscription is renewed.

The systems and methods described above may include implementations of the disclosure that include or involve the use of computing devices. Specifically, embodiments of the present disclosure may be implemented on one or more computing devices, including one or more servers, one or more client terminals, including computer terminals, a combination thereof, or on any of myriad computing devices currently known in the art, including without limitation, personal computers, laptops, notebooks, tablet computers, touch pads (such as the Apple iPad, SmartPad Android tablet, etc.), multi-touch devices, smart phones, personal digital assistants, other multi-function devices, stand-alone kiosks, etc. An exemplary computing device for implementing a computational device is illustrated in FIG. 34

Figure 34:
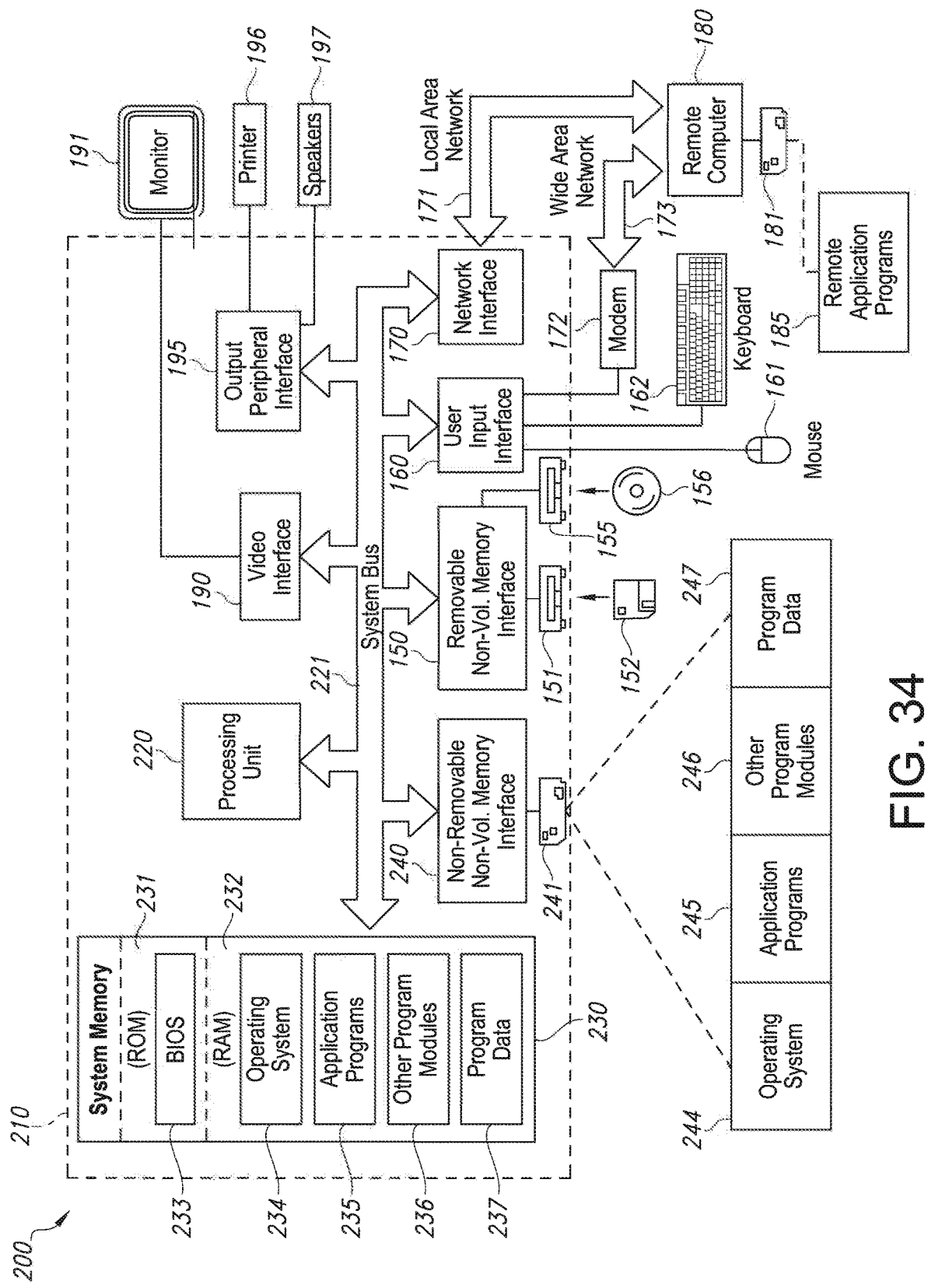
FIG. 34 illustrates an example of a suitable computing system environment on which feature of the disclosed concepts may be implemented.

With reference to FIG. 34, an exemplary system that may be used for implementing the disclosure includes a computing device 210 which may be used for implementing a client, server, mobile device or other suitable environment for the disclosure. Components of computing device 210 may include, but are not limited to, a processing unit 220, a system memory 230, and a system bus 221 that couples various system components including the system memory 230 to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computing device 210 typically includes a variety of computer readable media. Computer readable media may be defined as any available media that may be accessed by computing device 210 and includes both volatile and nonvolatile media, removable and non-removable media. By way of example, and not limitation, computer readable media may include computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash, solid state, or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 210. Combinations of the any of the above should also be included within the scope of computer readable media.

The system memory 230 may include computer storage media in the form of volatile and/or nonvolatile memory such as read only memory (ROM) 231 and random access memory (RAM) 232. A basic input/output system 233 (BIOS), containing the basic routines that help to transfer information between elements within computing device 210, such as during start-up, is typically stored in ROM 231. RAM 232 typically contains data and/or program modules that are immediately accessible to and/or presently being operated on by processing unit 220. By way of example, and not limitation, FIG. 34 illustrates operating system 234, application programs 235, other program modules 236, and program data 237.

The computing device 210 may also include other removable/non-removable, volatile/nonvolatile computer storage media. By way of example only, FIG. 34 illustrates a hard disk drive 241 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 151 and optical disk drive 155 are typically connected to the system bus 121 by a removable memory interface, such as interface 150.

The drives and their associated computer storage media discussed above and illustrated in FIG. 34, provide storage of computer readable instructions, data structures, program modules and other data for the computing device 210. In FIG. 34, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 162 and pointing device 161, commonly referred to as a mouse, trackball, touch screen, or multi-touch input device. Other input devices (not shown) may include a microphone, joystick, game pad, satellite dish, scanner, movement sensor device such as the Microsoft Kinect or the like. These and other input devices are often connected to the processing unit 220 through a user input interface 160 that is coupled to the system bus 221, but may be connected by other interface and bus structures, such as a parallel port, game port or a universal serial bus (USB). A monitor 191 or other type of display device may also be connected to the system bus 221 via an interface, such as a video interface 190. In addition to the monitor 191, computers may also include other peripheral output devices such as speakers 197 and printer 196, which may be connected through an output peripheral interface 195.

The computing device 210 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computing device 210, although only a memory storage device 181 has been illustrated in FIG. 34. The logical connections depicted in FIG. 34 include a local area network (LAN) 171 and a wide area network (WAN) 173, but may also include other networks. Such networking environments are commonplace in offices, enterprise-wide computer networks, intranets, the Internet, and cloud computing.

When used in a LAN networking environment, the computing device 210 is connected to the LAN 171 through a network interface or adapter 170. When used in a WAN networking environment, the computer 210 typically includes a modem 172 or other means for establishing communications over the WAN 173, such as the Internet. The modem 172, which may be internal or external, may be connected to the system bus 221 via the user input interface 160, or other appropriate mechanism. In a networked environment, program modules depicted relative to the computing device 210, or portions thereof, may be stored in the remote memory storage device. By way of example, and not limitation, FIG. 34 illustrates remote application programs 185 as residing on memory device 181. It will be appreciated that the network connections shown are exemplary and other means of establishing a communications link between the computers may be used.

The method described above with reference to FIG. 33 may be implemented on a computing device as described above. A kiosk, or another computer can be made available to a consumer to input order information at a nursery or other retailer. The computer may input the user's order information into a database, the computer may further transmit the order information to a plant provider. The plant provider may be located within the nursery or retailer, or may be remotely located, in order to arrange for the delivery of the ordered plant(s) 2 in a planter insert 20 in accordance with the order information. For orders that include subscriptions, the database be used, directly or indirectly, to arrange the delivery of replacement plants 2 in planter insert by periodically sending reminders to the plant provider to plant or deliver plants 2 in planter inserts 20 in accordance with the subscription information.

The method described above may also be implemented on a website which consumers may access from anywhere they choose. The consumer may provide order information via an order form on an interactive website, which then may store or otherwise transmit the order information to a database. Website may further transmit the order information to a plant provider directly, such as via email, or by making the order information available to the plant provider via a database to which the plant provider has access, and thereby arrange for the delivery of plants in accordance with the order information. For orders that include subscriptions, the database may be used to arrange the delivery of replacement plants 2 in planter insert by periodically sending reminders to the plant provider to plant or deliver plants 2 in planter inserts 20 in accordance with the subscription information.

The method described above may also be implemented on an app that runs on a smart phone, or another mobile device or computer, which consumers may access from anywhere they choose. The consumer may provide order information via an order form on the app, which then may store or otherwise transmit the order information to database. The database or app may further transmit the order information to a plant provider directly, such as via email, or by making the order information available to the plant provider via a database to which the plant provider has access, and thereby arrange for the delivery of plants in accordance with the order information. For orders that include subscriptions, the database or app may be used to arrange the delivery of replacement plants 2 in planter insert by periodically sending reminders to the plant provider to plant or deliver plants 2 in planter inserts 20 in accordance with the subscription information.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions, types of materials and coatings described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

We claim:

1. An insertable planter system comprising:
    a container comprising:
        a rim;
        an outer wall comprising an inner surface; and
        a bottom portion comprising a floor,
        wherein the inner surface and the floor define a liquid reservoir, and
        wherein the floor further comprises a positioning structure; and
    an insert comprising:
        a top surface, wherein the top surface fits in or abuts the rim of the container;
        a sidewall;
        a bottom, wherein the sidewall and the bottom define a plant chamber, and wherein the sidewall extends from the top surface until the bottom; and
        a supporting structure comprising one or more hollow legs, wherein each leg terminates in a foot, and wherein at least one leg comprises one or more openings suitable for liquid to enter a cavity of the leg,
        wherein the one or more openings is a continuous opening extending through a portion of the bottom to the leg,
    wherein the container receives the insert such that the insert can be rotated into a suitable orientation where the foot of each of the legs of the supporting structure engages the positioning structure of the container, such that the outer surface of the sidewall and bottom of the insert along with the inner surface of the container define a chamber comprising the liquid reservoir and the legs of the supporting structure are inside the liquid reservoir.

2. The insertable planter system of claim 1 wherein the positioning structure is an asymmetric positioning structure, and wherein the supporting structure is an asymmetric, complementary supporting structure such that the insert can be rotated into only one suitable orientation where the asymmetric positioning structure engages the asymmetric complementary supporting structure.

3. The insertable planter system of claim 2 wherein the foot of each of the at least one support is arranged in a segmented, annular pattern.

4. The insertable planter system of claim 1 wherein the positioning structure comprises at least one inner projection, and the at least one inner projection defines at least one recess, and the supporting structure comprises at least one complementary structure, such that the at least one recess of the positioning structure is capable of receiving the at least one complementary structure of the supporting structure.

5. The insertable planter system of claim 4 wherein the at least one inner projection comprises a first inner projection, a second inner projection, and a third inner projection, and
    wherein the at least one recess comprises a first recess, a second recess, and a third recess, such that the first recess is capable of receiving a first foot of the at least one complementary structure of the supporting structure;

wherein the second recess is capable of receiving a second foot of the at least one complementary structure of the supporting structure; and wherein the third recess is capable of receiving a third foot of the at least one complementary structure of the supporting structure.

6. The insertable planter system of claim 4 wherein the at least one inner projection is arranged in a segmented, annular pattern.

7. The insertable planter system of claim 1 wherein the positioning structure comprises at least one recess, such that the at least one recess of the positioning structure is capable of receiving at least one foot of the supporting structure.

8. The insertable planter system of claim 7 wherein the at least one recess comprises a first recess, a second recess, and a third recess, such that the first recess is capable of receiving a first foot of the at least one foot of the supporting structure; the second recess is capable of receiving a second foot of the at least one foot of the supporting structure; and the third recess is capable of receiving a third foot of the at least one foot of the supporting structure.

9. The insertable planter of claim 7 wherein each of the at least one recess is arranged in a segmented, annular pattern.

10. The insertable planter system of claim 1 further comprising a liquid level indicator.

11. The insertable planter system of claim 1, wherein in use the plant chamber and the hollow legs comprise soil and wherein the one or more openings are the only openings in the insert that allow liquid from the liquid reservoir to enter the soil.

12. A container planter comprising:
a rim;
an outer wall comprising an inner surface; and
a bottom portion comprising a floor,
wherein the inner surface and floor define a liquid reservoir,
wherein the floor comprises an asymmetric positioning structure, and
wherein the container planter is capable of receiving a planter insert comprising a sidewall; a bottom; and a complementary supporting structure comprising one or more hollow legs, wherein each leg terminates in a foot, such that the insert can be rotated into only one suitable orientation where the foot of each of the legs of the supporting structure engages the positioning structure, such that the outer surface of the sidewall and bottom of the insert along with the inner surface of the container define a chamber comprising the liquid reservoir and the legs of the supporting structure are inside the liquid reservoir,
wherein the planter insert is in the suitable orientation, the asymmetric positioning structure engages the complementary supporting structure, and a water outlet or water outlet marker on the outer wall of the container planter is aligned in a position relative to a water intake hole of the insert.

13. A planter insert comprising:
a top surface;
a sidewall;
a bottom, wherein the sidewall and bottom define a plant chamber and wherein the sidewall extends from the top surface until the bottom; and
a supporting structure, comprising one or more hollow legs, wherein each leg terminates in a foot, and wherein at least one leg comprises one or more openings suitable for liquid to enter a cavity of the leg, wherein the planter insert is capable of being inserted into a container comprising a positioning structure that is complementary to the supporting structure, such that the top surface fits in or abuts the rim of the container and the planter insert can be rotated into a suitable orientation where foot of each of the legs of the supporting structure engages the complementary positioning structure, such that the outer surface of the sidewall and bottom of the insert along with the inner surface of the container define a chamber comprising a liquid reservoir and the legs of the supporting structure are inside the liquid reservoir, and wherein the one or more openings is a continuous opening extending through a portion of the bottom to the leg.

14. The planter insert of claim 13 further comprising soil disposed in the plant chamber and a plant planted in the plant chamber.

15. The planter insert of claim 14 further comprising a removable cover attached to the top surface of the planter insert, the cover comprising an opening allowing the plant to pass through the cover.

16. The planter insert of claim 13, wherein the plant chamber and the hollow legs comprise soil, and wherein the one or more openings are the only openings in the planter insert that allow liquid from the liquid reservoir to enter the soil.

17. A plant unit delivery method comprising the steps of:
(i) providing a method for receiving orders for plants from a customer;
(ii) receiving a first order from the customer for a first plant; and
(iii) coordinating delivery of a first plant unit comprising the first plant that is disposed in soil inside a plant chamber of a first planter insert, the first planter insert comprising:
a top surface;
a sidewall;
a bottom, wherein the sidewall and bottom define the plant chamber of the first planter insert, and wherein the sidewall extends from the top surface until the bottom; and
a supporting structure comprising one or more hollow legs, wherein each leg terminates in a foot, and wherein at least one leg comprises one or more openings suitable for liquid to enter a cavity of the leg, and wherein the one or more openings is a continuous opening extending through a portion of the bottom to the leg;
wherein the first planter insert is capable of being inserted into a container comprising a complementary positioning structure, such that the top surface fits in or abuts the rim of the container and the first planter insert can be rotated into a suitable orientation where the supporting structure of the first planter insert engages the complementary positioning structure, such that the outer surface of the sidewall and bottom of the insert along with the inner surface of the container define an enclosed a chamber comprising a liquid reservoir and the legs of the supporting structure are inside the liquid reservoir.

18. The delivery method of claim 17:
wherein step (i) allows the customer to select a subscription;
wherein in step (ii), the first order from the customer includes subscription information comprising a specified time interval; and wherein the method further comprises (iv) coordinating the delivery of a replacement plant unit to replace the first plant unit at the specified time interval, wherein the replacement plant unit comprises a replacement plant that is disposed in soil inside a plant chamber of a replacement planter insert, the replacement planter insert comprising:

a top surface;

a sidewall;

a bottom, wherein the sidewall and bottom define the plant chamber of the replacement planter insert, and wherein the sidewall extends from the top surface until the bottom; and a supporting structure comprising one or more hollow legs, wherein each leg terminates in a foot, and wherein at least one leg comprises one or more openings suitable for liquid to enter a cavity of the leg, and wherein the one or more openings is a continuous opening extending through a portion of the bottom to the leg;

wherein the replacement planter insert is capable of being inserted into the container such that that the top surface fits in or abuts the rim of the container and the replacement planter insert can be rotated into the suitable orientation where the supporting structure of the replacement planter insert engages the complementary positioning structure, such that the outer surface of the sidewall and bottom of the insert along with the inner surface of the container define an enclosed a chamber comprising a liquid reservoir and the legs of the supporting structure are inside the liquid reservoir.

19. The delivery method of claim 18, wherein the first plant unit and replacement plant unit are seasonally appropriate for a respective season in which each of the first plant unit and the replacement plant unit were delivered.

20. The delivery method of claim 18 wherein steps (iii) and (iv) are accomplished by providing the customer with access to an application that is capable of running on a computing device, and receiving from the computing device the subscription information, including the regular specified time interval.

* * * * *